US008630727B2

(12) United States Patent
Estes

(10) Patent No.: US 8,630,727 B2
(45) Date of Patent: *Jan. 14, 2014

(54) CLOSED LOOP ANALOG SIGNAL PROCESSOR ("CLASP") SYSTEM

(75) Inventor: Christopher A. Estes, Nashville, TN (US)

(73) Assignee: Endless Analog, Inc, Nashville, TN (US)

(*) Notice: Subject to any disclaimer, the term of this patent is extended or adjusted under 35 U.S.C. 154(b) by 597 days.

This patent is subject to a terminal disclaimer.

(21) Appl. No.: 12/757,857

(22) Filed: Apr. 9, 2010

(65) Prior Publication Data
US 2010/0296673 A1 Nov. 25, 2010

Related U.S. Application Data

(63) Continuation-in-part of application No. 11/467,523, filed on Aug. 25, 2006, now Pat. No. 7,751,916.

(60) Provisional application No. 60/711,576, filed on Aug. 26, 2005.

(51) Int. Cl.
G06F 17/00 (2006.01)
H04R 1/40 (2006.01)
H04B 1/00 (2006.01)
H04B 1/20 (2006.01)
G11B 17/00 (2006.01)
G11B 20/10 (2006.01)
G11B 27/22 (2006.01)

(52) U.S. Cl.
USPC ............... 700/94; 381/97; 381/119; 369/4; 369/83; 369/47.36

(58) Field of Classification Search
USPC ........................................................ 700/94
See application file for complete search history.

(56) References Cited

U.S. PATENT DOCUMENTS 3,559,861 A 2/1971 Knox
3,573,390 A 4/1971 Frost et al.
(Continued)

FOREIGN PATENT DOCUMENTS

GB 526984 9/1940
GB 935752 4/1963
(Continued)

OTHER PUBLICATIONS

Huber, David Miles and Robert E. Runstein, "Modern Recording Techniques," Elsevier, Sixth Edition, pp. v-xvi, 187-213 and 299-346.

(Continued)

Primary Examiner — Davetta W Goins
Assistant Examiner — Daniel Sellers
(74) Attorney, Agent, or Firm — Wood, Herron & Evans, LLP

(57) ABSTRACT

A system, device, and method for recording audio with the character and sonic benefits of a genuine analog recording is disclosed. More specifically, an electro-mechanical-software controlled closed loop analog signal processor ("CLASP") system which is comprised of a CLASP unit containing firmware, a latency detection module, and CLASP hardware display and controls. The CLASP system further comprises CLASP software operably running on a digital audio workstation ("DAW") which is also in operable communication with the CLASP unit. The CLASP unit is also in operable communication with an analog recordable medium. An analog audio signal is recorded on the analog recordable medium, which may consist of a coated tape, cup, cylinder, drum, or disk, and then immediately played back and routed to the DAW via an analog to digital converter, thus providing for digitally recorded analog audio. The CLASP system may also include converters and a mixing console.

10 Claims, 23 Drawing Sheets

(56) References Cited

U.S. PATENT DOCUMENTS

| | | | |
|---|---|---|---|
| 3,645,539 | A | 2/1972 | Jenkins |
| 3,685,031 | A | 8/1972 | Cook |
| 3,705,272 | A | 12/1972 | Tsuji et al. |
| 3,748,381 | A * | 7/1973 | Strobele et al. ............ 386/285 |
| 3,757,058 | A | 9/1973 | Ingoldsby |
| 3,877,338 | A | 4/1975 | David |
| 4,011,592 | A | 3/1977 | Kawada |
| 4,211,997 | A | 7/1980 | Rudnick et al. |
| 4,460,931 | A | 7/1984 | Takeuchi |
| 5,467,288 | A | 11/1995 | Fasciano et al. |
| 5,506,910 | A * | 4/1996 | Miller et al. ............ 381/103 |
| 5,559,962 | A | 9/1996 | Okamura et al. |
| 5,596,646 | A | 1/1997 | Waller, Jr. et al. |
| 5,600,756 | A | 2/1997 | Ely |
| 5,634,020 | A | 5/1997 | Norton |
| 5,802,182 | A * | 9/1998 | Pritchard ............ 381/61 |
| 5,842,014 | A | 11/1998 | Brooks et al. |
| 5,883,804 | A | 3/1999 | Christensen |
| 6,009,507 | A | 12/1999 | Brooks et al. |
| 6,072,796 | A | 6/2000 | Christensen et al. |
| 6,084,569 | A | 7/2000 | Ricotta et al. |
| 6,086,620 | A | 7/2000 | Oliver et al. |
| 6,128,681 | A | 10/2000 | Shephard |
| 6,134,379 | A | 10/2000 | LaMacchia |
| 6,144,798 | A | 11/2000 | Nagasawa et al. |
| 6,212,197 | B1 | 4/2001 | Christensen et al. |
| 6,271,829 | B1 | 8/2001 | Ricotta et al. |
| 6,285,518 | B1 | 9/2001 | Zweighaft |
| 6,314,403 | B1 | 11/2001 | Jeffery |
| 6,356,178 | B1 | 3/2002 | Isozaki |
| 6,393,198 | B1 | 5/2002 | LaMacchia |
| 6,507,658 | B1 | 1/2003 | Abel et al. |
| 6,592,245 | B1 | 7/2003 | Tribelsky et al. |
| 6,664,913 | B1 | 12/2003 | Craven et al. |
| 6,784,812 | B2 | 8/2004 | Craven et al. |
| 6,829,017 | B2 | 12/2004 | Phillips |
| 6,870,936 | B1 | 3/2005 | Ajamian |
| 6,891,482 | B2 | 5/2005 | Craven et al. |
| 7,256,962 | B2 | 8/2007 | Tatcishi |
| 7,382,966 | B2 | 6/2008 | Kobayashi et al. |
| 7,751,916 | B2 | 7/2010 | Estes |
| 2004/0064838 | A1 * | 4/2004 | Olesen et al. ............ 725/105 |
| 2005/0213436 | A1 * | 9/2005 | Ono et al. ............ 369/13.02 |
| 2007/0039449 | A1 | 2/2007 | Redmann |
| 2007/0050062 | A1 | 3/2007 | Estes |
| 2007/0136782 | A1 | 6/2007 | Ramaswamy |

FOREIGN PATENT DOCUMENTS

| | | |
|---|---|---|
| GB | 2072926 | 10/1981 |
| JP | 57179909 | 11/1982 |

OTHER PUBLICATIONS

Barnes & Noble, "Modern Recording Techniques", search.barnesandnoble.com, print page version, pp. 1-2. http://search.barnesandnoble.com/booksearch/pfp.asp?ean=9780240806259.

Roland, "Chorus Echo RE-301 Instructions" Jul. 1979, Roland, Printed in Japan, pp. 1-7.

Dunn, Harold, "CLASP Scores #1 Single in Germany with Music Artist Derek Sholl", Oct. 15, 2008.

Endless Analog, "CLASP Wins PAR Excellence Awards at AES", Oct. 17, 2008.

Rivers, Mike, "Analog in the Studio: Nostalgia Ain't What It Used To Be", Dec. 9, 2008.

Swenson, Kyle, "Business Tennessee Magazine—Endless Analog Across the State", Jan. 1, 2009.

Endless Analog, "Digidesign Grants Full Developer License to Endless Analog", Apr. 6, 2009.

Petersen, George, "50 Cool Add-Ons That Take Your Workstation to the Next Step", Aug. 6, 2009 (posted online by Mix Magazine).

David, "Sonic Scoop—'Best of AES 2003' List", Oct. 13, 2009.

Cochran, Nicole, "Endless Analog Warms up AES New York", Oct. 30, 2009.

Endless Analog, "Beatles 4 Track Studer J37 Now Supported by CLASP", Nov. 8, 2009.

Endless Analog, "Lenny Kravitz Keeps Analog Recording Alive with CLASP", Dec. 17, 2009.

Mix Magazine, "Lenny Kravitz' Gregory Town Sound & CLASP", Cover Story, Feb. 28, 2010.

Endless Analog, "Endless Analog Appoints Clyne Media to Lead Marketing and Public Relations Initiatives", Mar. 10, 2010.

Clyne Media, "Pro Sound News—Chapman Adopts CLASP", Mar. 31, 2010.

US 5,847,769, 8/1998, Cooper (withdrawn).

International Search Report and Written Opinion in corresponding PCT/US2010/052498 mailed Apr. 21, 2011, 21 pages.

* cited by examiner

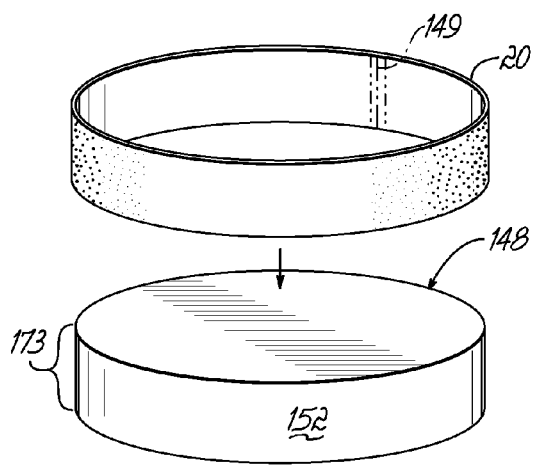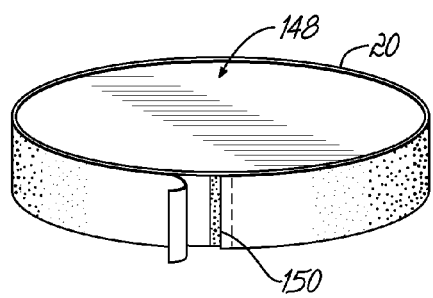
FIG. 8A    FIG. 8B
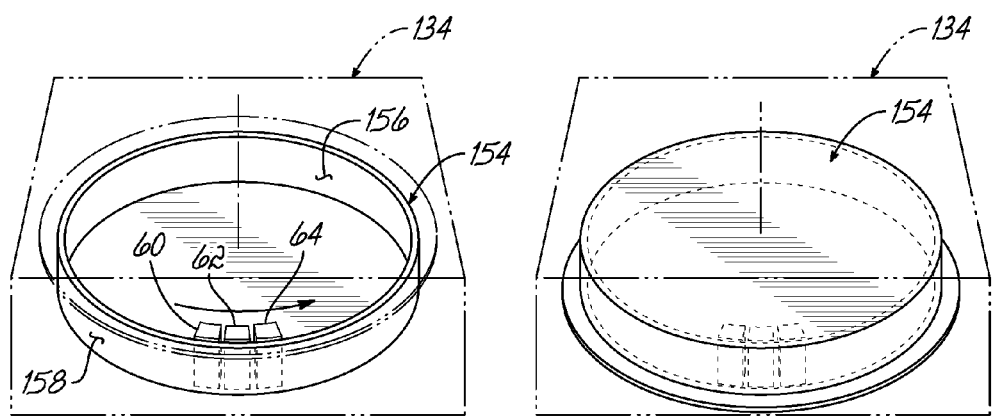
FIG. 9A    FIG. 9B

CLOSED LOOP ANALOG SIGNAL PROCESSOR ("CLASP") SYSTEM

RELATED APPLICATIONS

This application claims priority to application Ser. No. 11/467,523, filed Aug. 25, 2006, entitled CLOSED LOOP ANALOG SIGNAL PROCESSOR ("CLASP"), now pending, which claimed priority to Application 60/711,576 filed Aug. 26, 2005, entitled CLOSED LOOP ANALOG SIGNAL PROCESSOR "CLASP," both of which are incorporated by reference herein.

FIELD OF THE INVENTION

The present invention relates to sound recording devices in general and, more particularly, to analog audio recording devices.

BACKGROUND OF THE INVENTION

Today many, if not most, professional or semi-professional sound, music, or like audio recordings are recorded and produced digitally. Similarly, audio that is broadcast both to an audience in an auditorium or like concert venue, or that is broadcast via radio or television is increasingly produced and/or transmitted digitally. In those processes, recording engineers typically use an audio digital audio workstation ("DAW"). However, despite the now nearly ubiquitous presence of digital recordings, music, and audio files, as well as the increasingly presence of digital broadcasts, many artists, musicians, recording engineers, music producers, and audiophiles still prefer the sound of analog tape recordings over digital recordings because of the warmth, character, and nostalgic flavor of analog tape recordings.

Although there is a desire for the sound of analog recordings, there are a number of limitations that typically discourage any attempt to use a traditional multi-track analog tape recording system in combination with a DAW. First, many engineers and producers find that attempting to synchronize a traditional analog tape machine to a DAW to be problematic. For example, some of the problems engineers may encounter when trying to use analog tape machines in conjunction with a DAW include:

(1) Using the Society of Motion Picture and Television Engineers ("SMPTE") time code to synchronize the DAW with the tape machine. This sacrifices one of the tape tracks and wastes time waiting for the two devices to synchronize.

(2) Constant rewinding and fast forwarding of the analog tape machine. This takes time away from a session and hurts creative work flow.

(3) Having to transfer the analog tape recorded tracks into the DAW for editing. This is time consuming and breaks the creative work flow.

(4) Big bulky and expensive analog recording machines. Many studios are in people's homes now where space is limited and large format analog recorders are still very expensive.

(5) Live broadcast of audio performances are difficult to coordinate and manipulate without first digitizing the audio sounds.

In short, because of the difficulties of using a standard multi track analog tape recording system with a DAW, many engineers typically resort to using only a DAW to do all of their recording. Similarly, in a live broadcast context, the sounds are typically first digitized before being transmitted. In other words, engineers and producers sacrifice the warmth and pleasing sound of classic analog tape for the convenient but characterless and thin sound of digital recording.

OBJECTS OF THE INVENTION

It is therefore an object of the invention to allow engineers, music producers, and like personnel to record and/or broadcast sounds and music with the character of a genuine analog tape recording. It is also an object of the invention to record music and sounds with the quality of an analog tape recording without the existing hassles and limitations currently involved in using a DAW. It is yet another object of the invention to provide a system and/or components therefore that will allow engineers, music producers, as well as hobbyist, home users, audio enthusiasts, or amateurs to achieve the coveted sound of analog recordings while utilizing at least some of their present studio or recording and processing equipment. It another object of the invention to provide for the same quality of analogically recorded sounds to be used in a live broadcast environment.

SUMMARY OF THE INVENTION

A system, apparatus, device, and method for recording sounds and music with the character and sonic benefits of a genuine analog tape recording is disclosed. More specifically, an electro-mechanical-software controlled closed loop analog signal processor ("CLASP") system which is comprised of a CLASP unit or device containing firmware, a latency detection module, and CLASP hardware display and controls as needed. The CLASP system further comprises CLASP software operably running on a digital audio workstation ("DAW") resident on a host computer and which is also in operable communication with the CLASP unit. The CLASP unit is also in operable communication with an analog recordable medium which may utilize a tape recorder transport which is comprised of a tape mechanism transport and a control unit. In one embodiment, an analog audio signal is recorded on an analog tape, which may be in the form of an endless loop or a reel-to-reel configuration, and then immediately played back and routed to the DAW via an analog-to-digital ("A/D") converter, thus providing for digitally recorded analog audio. Typically, after the analog recorded signal is played back, it is erased from the tape which generally continues to cycle. In other embodiments, an analog audio signal is recorded on other analog recordable medium, which may consist of a cylinder, drum, disk, or other like component.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

FIG. 8A is a disassembled perspective view of a recordable medium for use in one of the embodiments of the present invention shown in FIG. 4.

FIG. 8B is a perspective view of an alternative embodiment of the recordable medium shown in FIG. 8A for use with a continuous tape loop device.

FIG. 9A is a diagrammatic perspective view of an embodiment of the present invention shown in FIG. 4.

FIG. 9B is a diagrammatic perspective view of an alternative embodiment of an embodiment of the present invention shown in FIGS. 4 and 9A.

DETAILED DESCRIPTION OF THE INVENTION

Figure 1:
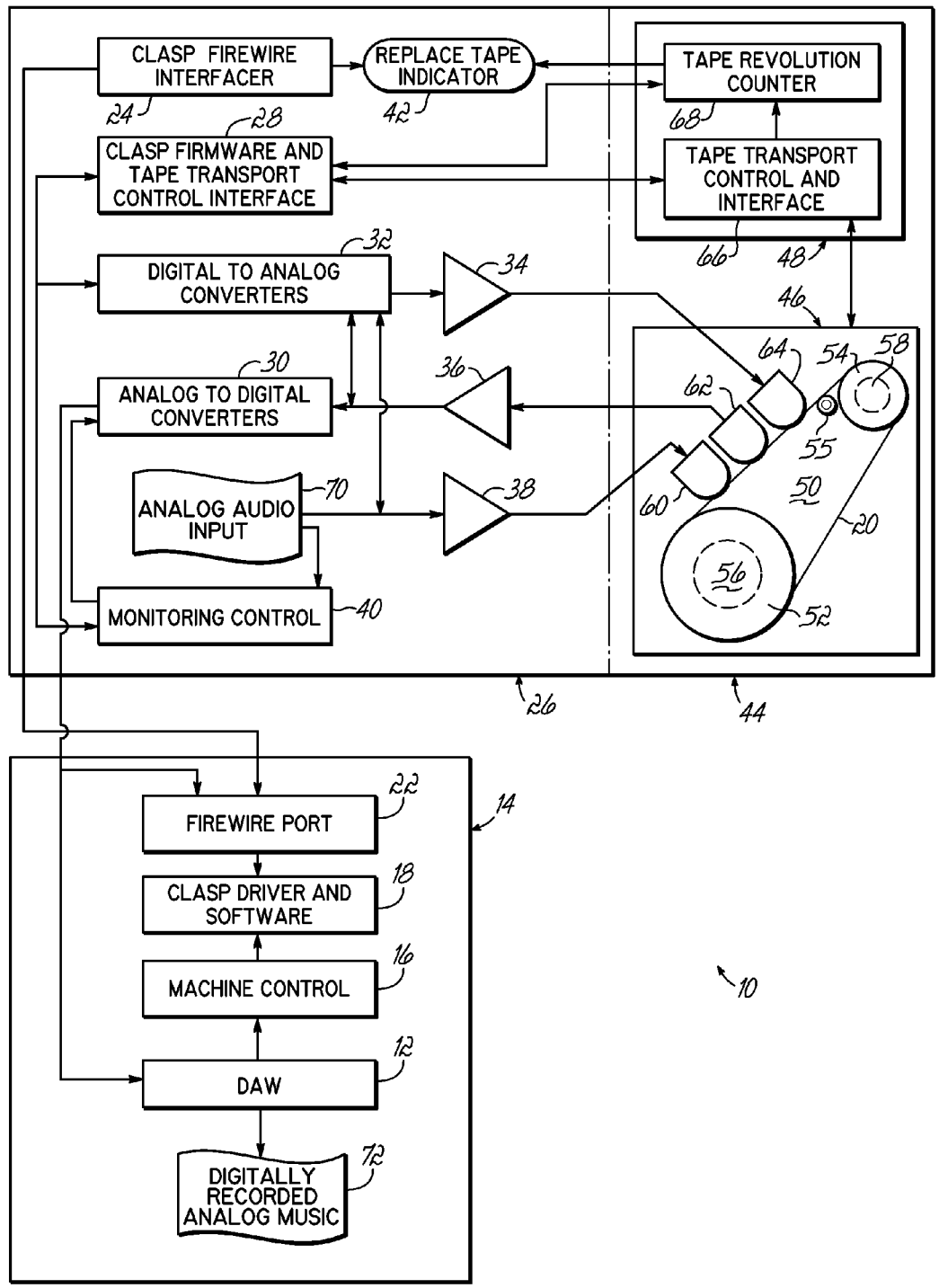
FIG. 1 is a schematic drawing of one embodiment of the present invention.

FIG. 1 illustrates one embodiment of a closed loop analog signal processor ("CLASP") system 10 of the present invention. As illustrated, on embodiment of the system 10 utilizes a digital audio workstation ("DAW") 12 resident on a host computer 14. Examples of DAWs that might be utilized include, but are not limited to, the Pro Tools|HD® systems by Digidesign®, a division of Avid Technology, Inc., located at 2001 Junipero Serra Boulevard, Daly City, Calif. 94014-3886, or Nuendo by Steinberg Media Technologies GmbH. Other DAWs known to those skilled in the art may also be used in accordance with the principles of the present invention. The host computer 14 may be a standard personal computer ("PC") or a specially made or adapted computer, processor, or workstation. Also, the components and functions of the host computer 14 could in alternative embodiments be spread out, dispersed, or located on multiple machines, and those machines could be located in multiple geographically dispersed locations.

The host computer 14 also contains a machine control 16 which is in operable communication with the DAW 12 and provides control to the host computer 14. The machine control 16 also allows for a user to interface with the host computer 14 and the DAW 12 software. For example, a user will typically interact with the DAW 12 via the host computers 14 keyboard, mouse, and/or monitor.

As illustrated, the host computer 14 will also typically contains a CLASP driver and software 18. The CLASP driver software 18 provides a graphic user interface ("GUI") on the display monitor of the DAW host computer 14. This GUI typically will show the user both peak and volume unit ("VU") style level meters for a tape 20 record and playback levels. There will also typically be indicators showing tape 20 usage and calibration settings. Tape 20 speed is also controlled via the software 18. Other features such as tape 20 noise reduction and variable speed control may also be included. The CLASP driver software 18 will also typically control the monitoring options for the CLASP system 10. For example, the CLASP driver software 18 will typically allow users to monitor pre-recorded sounds and post-recorded sounds while recording or tracking those sounds. The user will be able to select these, and other features, from a GUI menu. Additionally, the CLASP driver software 18 will allow an artist, musician, or the like recorder to monitor the pre-recorded sounds while the post-recorded analog sounds, which have been converted to a digital signal, are being digitally recorded in the DAW. The CLASP software 18 allows this monitoring to be done with no delay, feedback, or other tape artifacts.

The host computer 14 has an interface 22 to allow it to operably communicate with a corresponding interface 24 in a CLASP unit or device 26. As illustrated, these interfaces 22, 24 are firewire ports, but other interfaces, connections, or ports may also be utilized. For example, a Universal Serial Bus ("USB") port, an Ethernet connection, a multi-pin connection, a DigiLink connection, a fiber optic connection, and/or a wireless connection could also be used to operably connect the host computer 14 with the CLASP unit 26.

While a single CLASP unit 26a is illustrated, in practice, multiple CLASP units 26 may be used together. For example, additional CLASP devices 26 may be added to the system 10 to provide additional tracks per unit. Typically, each CLASP unit 26 will provide eight discrete audio tracks for analog tape signal processing. Accordingly, if a user wanted up to 16 tracks, two CLASP units 26 would be used in unison. Likewise if 24 tracks were desired, three CLASP units 26 would be used. Each CLASP device 26 would be configured to automatically daisy chain together and are thereby in operable communication with the DAW host computer 14. The CLASP driver software 18 recognizes each unit individually, displays information for each unit 26, and simultaneously synchronizes all the CLASP devices 26.

Typically the CLASP unit 26 will be a rack unit or a rack mounted unit, however, it may equally be configured so as to be a standalone unit, capable of resting on a table, the floor, or other support structure. When rack mounted, each CLASP device 26 is typically housed in a standard nineteen inch rack that utilizes very little space and provides for silent operation. Also, while the DAW host computer 14 and the CLASP unit 24 will generally be located in the same vicinity, like in the same recording studio or room, these components could also be physically separated, either in different parts of a room, different rooms of building, or even in different geographical locations.

The CLASP unit 26 typically includes a CLASP firmware and tape transport control interface 28. The firmware or microprogram 28 is typically stored in the read only memory ("ROM") of the CLASP unit 26. The CLASP unit 24 also typically contains an analog to digital ("A/D") converter, a digital to analog ("D/A") converter, various amplifiers 34, 36, 38, a monitoring control 40, and other components or circuitry known to those skilled in the art. The CLASP unit 26 may also contain a replace tape indicator 42, however this indicator 42 could also reside in another part of the system 10, for example in the GUI of the CLASP software 18 on the host computer 14.

As illustrated, the CLASP unit 26 is in operable communication with a tape recorder transport unit 44. As illustrated, the tape recorder transport unit 44 is further comprised of a tape mechanism transport 46 and a control unit 48. The tape recorder transport unit 44, the tape mechanism transport 46, and the control unit 48 may be configured as separate components, or may be integrated together. For example the tape recorder transport unit 44 or the tape mechanism transport 46 may be internal or part of the CLASP unit 26, or may exist as external components, separate and apart from the CLASP unit 26. In a configurations where the tape recorder transport 44 is an external component, a reel-to-reel multi track tape recorder such as is known to those skilled in the art (e.g., Otari Model No. MTR-90 MKII 2, available at Otari, 4-33-3 Kokuryo-cho Chofu-shi Tokyo 182-0022 Japan, Studer Model No. A-827, available at Studer, Althardstrasse 30 CH-8105 Regensdorf Switzerland, or the like) could be configured to be operably controlled by a Musical Instrument Digital Interface ("MIDI") machine control protocol, a Sony 9 pin control protocol, or a like control protocol to interface with the CLASP unit 26.

Figure 2:
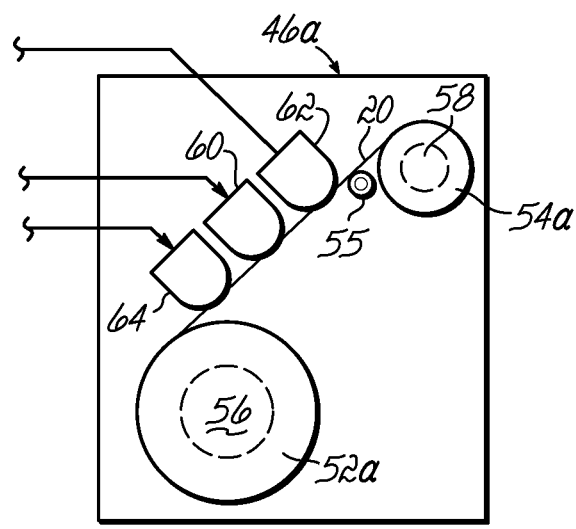
FIG. 2 is a schematic drawing of part of the system shown in FIG. 1 which may be used in an alternative embodiment of the present invention.

The tape mechanism transport 46 may be a standard transport mechanism known to those skilled in the art. For example, in one embodiment, the transport mechanism used with a Video Home System ("VHS") tape might be utilized. In other words, the analog audio tape 20 may be fashioned in a video cassette type of tape cartridge, but the tape will be adapted or formulated for analog or optimal analog audio recording. The tape 20 is typically housed in a removable cartridge for easy tape exchange. Typically, the tape will be a half inch in width, but other sizes may also be used. For example, if a cassette tape format was used, the tape would have a width of about an eighth of an inch. The tape may be in the form of an endless loop 50 cartridge that loops around two reels 52, 54, or a standard reel-to-reel 52a, 54a cartridge, as shown in FIG. 2. In embodiments where the tape mechanism transport 46a uses a non-endless loop tape, an endless tape loop effect may also be achieved by using two or more sets of tapes or tape cartridges. In other words, while one tape was recording or standing by to record, the other tape would be rewinding to allow for it to begin recording when the first tape was full. Multiple tape mechanism transports 46a would be unitized and synchronized to allow for a seamless recording experience. If a recorded tape was desired to be kept for archival or other purposes, a user may be prompted to replace that tape with a fresh one, while another tape was recording.

The tape mechanism transport 46 has a capstan motor 55 which pulls the tape 20 over the tape heads 56, 58 and is controlled by the CLASP driver software 18 via standard a MIDI machine control protocol, a Sony 9 pin control protocol, or a like control protocol. Such a protocol is found standard in most all DAW recording systems 12.

The tape recorder transport unit 44 also has stationary or rotary heads 60, 62, 64 which are operationally in contact with the tape 20. As illustrated, there is a separate record head 60, playback or reproduction ("repro") head 62, and erase head 64, however, one or more of these heads 60, 62, 64 could be configured into a single head. The tape recorder transport unit 44 will also have other components and circuitry known to those skilled in the art.

The control unit 48, as illustrated, is comprised of a tape transport control and interface 66 and a tape revolution counter 68. The control unit 48, and more specifically, the tape transport and interface 66 is in operable communication with the tape mechanism transport 46. The tape transport control and interface 66 is also in operable communication with the CLASP firmware 28 and provides an interface to and control of the tape mechanism transport 46. Also, while the control unit 48 is illustrated as a separate component of the tape recorder transport unit 44, it, or some of its components thereof, could also be located in other places of the system 10. For example, it or some of its components could also be located in the CLASP unit 26a.

While the drawing illustrates the inclusion of a tape revolution counter 68 is in the control unit 48, in alternative embodiments, particularly those that do not utilize a closed or endless loop tape configuration, the tape revolution counter 68 may be omitted. Nevertheless, in some embodiments, the tape revolution counter 68, or like counter, may be still be utilized in non-endless tape configurations to monitor when a tape is nearing its end and/or may need to be replaced. In embodiments that use a closed or endless loop tape 20, as illustrated, the tape revolution counter 68 monitors the revolutions or rotations of the tape 20. The tape revolution counter 68 is in operable communication with the CLASP firmware 28 and also with the replace tape indicator 42. Thus, the input from the tape revolution counter 68 to the CLASP firmware 28 is used to determine when to activate the replace tape indicator 42. While the drawings illustrate and it is herein described that the tape revolution counter 68 provides this input to the CLASP firmware 28 by counting the number of rotations or revolutions of the tape 20, other means of determining when the tape 20 should be replaced may also be utilized. For example, a counter could measure the distance the tape 20 has traveled, the amount of time the tape 20 has been in use, the performance of the tape 20, the time since the tape 20 was last changed, or other like methods of monitoring the potential wear on the tape 20. Also the CLASP unit 26 may contain a logic circuit that measures how many times the tape 20 passes over the playback and record heads 60, 62 and tells the user when it is time to replace the tape 20 or clean the tape heads 60, 62, 64 and mechanism 46.

In operation, an incoming analog audio input 70 originates from a microphone or other input source which is adapted to receive, capture, or pickup the sounds desired to be recorded. The analog audio input 70 is then typically routed through the record head amplifier 38 which amplifies the incoming audio signal and passes the signal on to either the stationary or rotary record head 60 which is in operational contact with the tape 20. After the record head 60 records the analog signal onto the tape 20, the playback head 62, located in the illustrated embodiment adjacent to the record head 60, picks up and reads the recorded signal. The playback head signal is then amplified by the playback or reproduction ("repro") head amplifier 36 and passes through an analog-to-digital ("A/D") converter 30. The digital signal is then routed to the DAW 12 located on the host computer 14. A digitally recorded analog music or sound 72 then results from the DAW 12.

During operations, the monitoring control 40 also monitors the analog audio input 70. The monitoring control 40 is in operable communication with the A/D converter 30 and allows a user to thus monitor both the pre-recorded as well as the post-recorded sounds during tracking.

The time delay from the record head 38 to the playback head 40 is calculated and compensated for by computer software communicating with a CLASP software driver 48 running on the DAW host computer 12. This ensures that CLASP over dubbed tracks are time and phase aligned for playback synchronization. This results in an invisible and seamless analog recording experience because the signals just seem to pass through the CLASP device 26 and onto the DAW 12 hard disk recorder.

In a closed or endless tape embodiment, after the tape 20 passes over the playback head 62, it then passes over an erase head 64 that erases the audio that was just recorded on that section of the endless tape 20. The endless loop tape 20 is thus able to be recycled and loop to start the process all over again. Similarly, a non-endless loop tape 20 may also pass over the erase head 64 after the recorded analog audio sound is picked up by the playback head 62. This may be particularly desirable in embodiments where multiple tapes 20 and multiple tape mechanism transports 46a are used in conjunction with one another to simulate an endless loop tape effect. Alternatively, the erase head 64 may be positioned to erase the analog audio tape 20 just prior the tape 20 is being re-recorded. In either case, the erase head 64 allows for one tape 20 to be used to record or be standing by to record while another tape 20 is being prepared to record again.

The system 10 uses industry standard MIDI machine control, Sony 9 pin control, or like control, via the CLASP driver software 18 so that the tape 20 is not in motion unless the DAW 12 is operating with record enabled on any given DAW tracks. This helps to prevent unnecessary tape 20 motion when the user is editing or doing any kind of playback that does not involve recording new audio onto DAW tracks. Hence, this helps to extend the life of the tape 20.

Figure 3A:
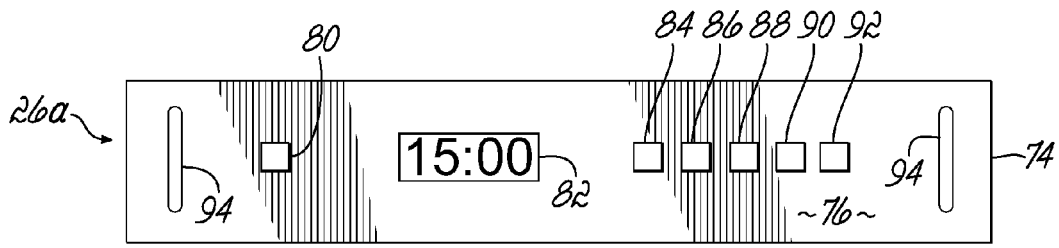
FIG. 3A is a front view of one embodiment of the present invention.
Figure 3B:
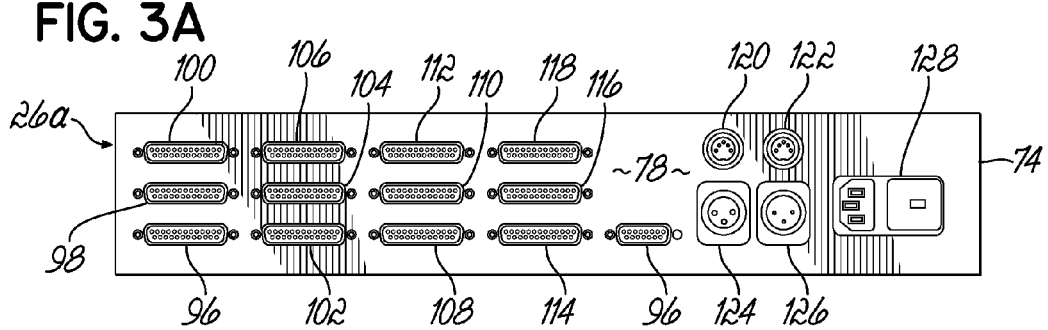
FIG. 3B is a rear view of the embodiment of the present invention shown in FIG. 3A.

FIGS. 3A and 3B illustrate one embodiment of a housing 74 for the CLASP unit 26a. FIG. 3A shows the front panel 76 of a rack mountable CLASP unit 26a and FIG. 3B shows the rear or back panel 78 of that CLASP unit 26a. As shown, the CLASP unit 26a has power button 80, a digital display 82, and a plurality of additional control buttons 84, 86, 88, 90, 92. These buttons 80, 84, 86, 88, 90, 92, and the display 82 may be illuminated to facilitate operation in reduced light conditions. The CLASP unit 26a may also have a pair of handles 94 to facilitate movement and installation of the CLASP unit 26a.

In the embodiment shown, one of the front panel 76 controls is an inches per second ("IPS") control button 84. This IPS control 84 is used to set the recordable medium speed of the CLASP hardware to match the recordable medium speed selected on an analog recorder. Typically, there may be three IPS settings, e.g., 30 IPS (which would typically provide up to 15 minutes of recording time), 15 IPS (which would typically provide up to 30 minutes of recording time), or 7 IPS (which would typically provide up to 60 minutes of recording time). In operation, the IPS on the analog recording device must mirror the IPS on the CLASP hardware unit 26a. The digital display 82 will indicate the IPS setting or the amount of record time, and will countdown as the recording occurs. The IPS setting is also reflected in the CLASP software 18 bridge plug-in display on the DAW 12.

Another front panel 76 control shown in FIG. 3A is post roll ("POST") control button 86. The post roll control 86 is used to prevent excess wear and tear on the analog recorder's transport by allowing the analog recorder to continue recording after the DAW transport has stopped. Typically, there are five settings: (A) Off; (B) 3 seconds; (C); 6 seconds; (D) 9 seconds; and (E) 12 seconds. In operation, a user might select a higher post roll setting if the user is starting and stopping the DAW 12 very quickly. The post roll setting is reflected on both the CLASP hardware display 82 and the CLASP software 18 bridge plug-in display on the DAW 12.

Another front panel 76 control shown in FIG. 3A is the monitoring ("MON") control button 88. The monitoring control 88 is used to select which bank of channels to record to in the DAW 12. Typically, there are three channel settings: 1-24; 1-16; and repro only. In the 1-24 and the 1-16 channel settings, the CLASP hardware unit 26 will only recognize DAW 12 track arming for channels 1-24 and 1-16, respectively. With the repro only setting, the delayed audio from the repro head 62 is always monitored while recording. The monitor settings are reflected on both the CLASP hardware display 82 and the CLASP software 18 bridge plug-in display on the DAW 12. Additionally, the monitor button 88 will flash when monitoring the DAW 12 repro head 62 and will light solid when monitoring the input head 60.

Another front panel 76 control shown in FIG. 3A is the synchronization ("SYNC") control button 90. The synchronization control 90 is used to synchronize the analog recorder to the DAW 12. Synchronization must be performed for each available recordable medium speed on each analog recorder that is connected to the CLASP system 10. The CLASP software provides memory to store synchronized settings for three separate analog recorders and their individual recordable medium speeds (typically, up to three recordable medium speed machines per machine). When performing synchronization, the CLASP hardware will display the machine SYNC plug-in that is about to be overwritten.

A final front panel 76 control shown in FIG. 3A is the return to zero ("RTZ") control button 92. The return to zero control 92 is used to rewind or rest the analog recorder to the beginning of the recordable medium 20.

Figure 3C:
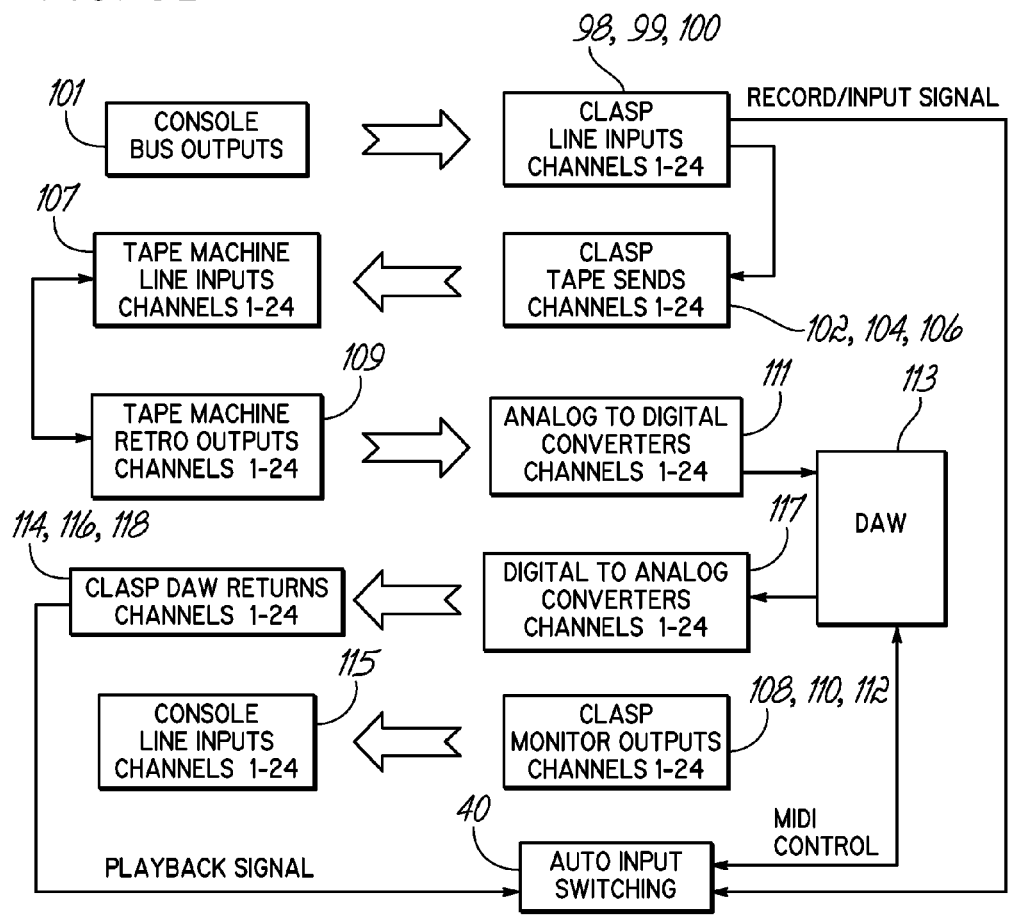
FIG. 3C is an operational signal flow diagram of the present invention shown in FIGS. 3A and 3B.

As shown in FIG. 3B, the back panel 78 of the CLASP unit 26a typically has a plurality of connection terminals. FIG. 3C further illustrates the operational signal flow of a typical CLASP unit 26a. For example, there may be input connections 96, 98, 100, for line level inputs to connect to microphone pre-outputs or console bus outputs 101. Additionally, there may be recordable medium send connections 102, 104, 106, whereby line level recordable medium send outputs are connected to analog recorder inputs 107. Repro outputs 109 from the analog recorder are in turn feed to an analog-to-digital ("A/D") converter 111 and into a DAW 113.

Also, there are monitor connections 108, 110, 112, whereby line level monitor outputs are connected to console input monitoring channels 115. There are also DAW 113 return connections 114, 116, 118, for connecting to line level DAW 113 digital-to-analog ("A/D") outputs 117. There is also a MIDI IN connector 120 for connecting to available MIDI output port on hardware MIDI interface and a MIDI OUT connector 122 to connect to available MIDI input port on hardware MIDI interface. Additionally, there is a SYNC IN connection 124 which is used to connect to the available channel on the analog recorder and a SYNC OUT connection 126 which is used to connect to balanced audio output of the same analog recording channel used with SYNC IN. Finally, there is a power supply connector 128.

Figure 4:
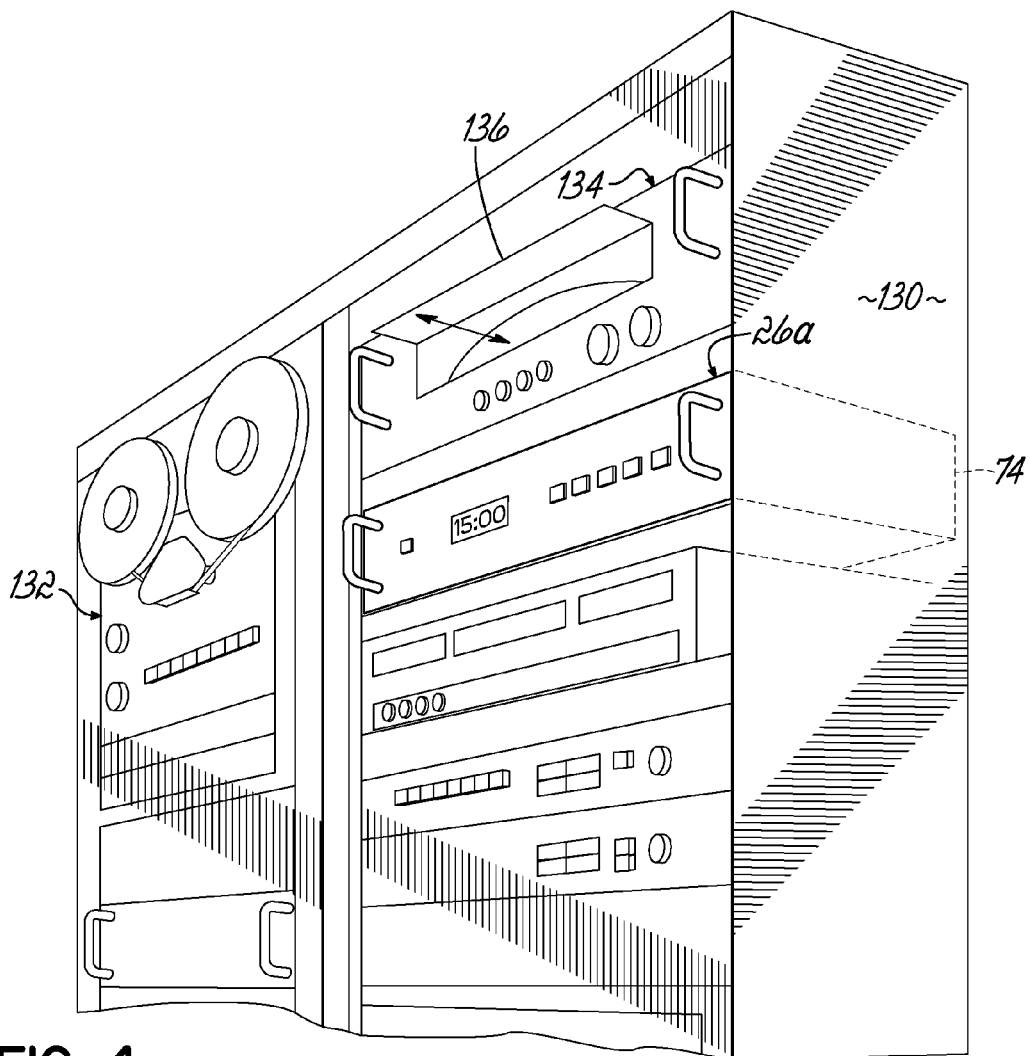
FIG. 4 is a perspective view of an audio rack holding various embodiments and components of the present invention.
Figure 5A:
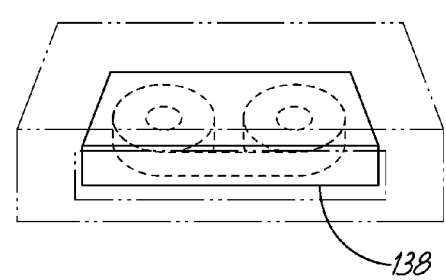
FIG. 5A is a perspective view of one of the embodiments of the present invention shown in FIG. 4.
Figure 5B:
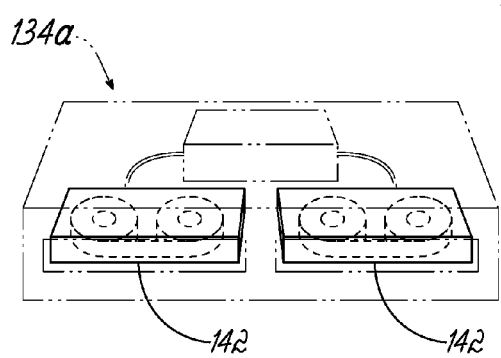
FIG. 5B is a perspective view of an alternative embodiment of the present invention shown in FIG. 5.
Figure 6:
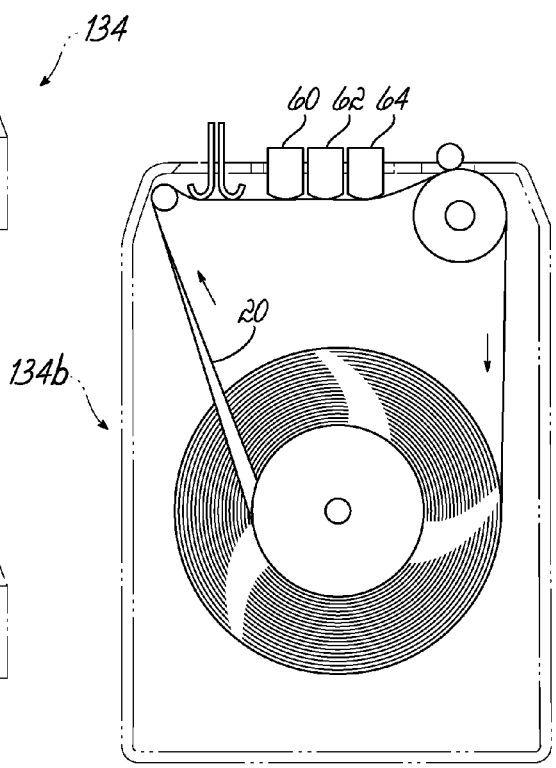
FIG. 6 is a diagrammatic view of an alternative embodiment of the present invention shown in FIGS. 4, 5A, and 5B using a continuous tape loop device.

As shown in FIG. 4, the CLASP unit 26 may be mounted along with other various components in a rack 130. In this embodiment, a reel-to-reel tape recorder 132 is also shown in rack mounted configuration. Additionally, an alternative embodiment of a CLASP unit 134 is shown with a door 136 providing access to a removable recordable medium. For example, as shown in FIG. 5A, the CLASP unit 134 could be adapted to receive a reel-to-reel style tape cartridge 138, e.g. a VHS or cassette like tape cartridge. Alternatively, as shown in the embodiment in FIG. 5B, a CLASP unit could be adapted to hold multiple reel-to-reel style tape cartridges 140, 142 which would allow for a continuous recording experience. In other words, one tape could be rewound while the other one was recording and vice-versa so that the amount of tape would not become a limiting factor during a recording session. As shown in FIG. 6, the CLASP unit 134 could also be adapted to receive an endless loop style cartridge, e.g., a Fidelipac or an eight-track like tape cartridge.

Figure 7A:
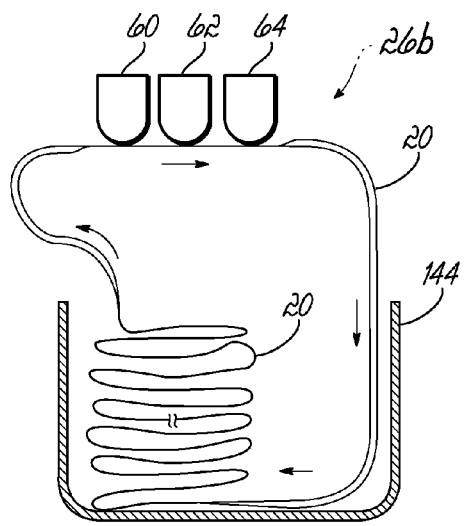
FIG. 7A is a diagrammatic view of an alternative embodiment of the present invention shown in FIG. 1 using a continuous tape loop device.
Figure 7B:
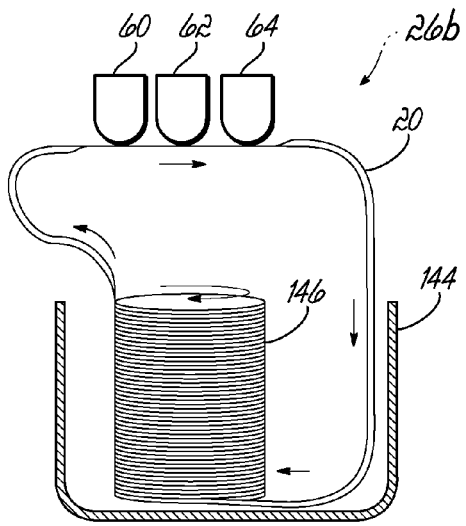
FIG. 7B is a diagrammatic view of an alternative embodiment of the present invention shown in FIGS. 1 & 7A using a continuous loop device.

FIGS. 7A and 7B illustrate still further configurations of an endless of loop tape 20 that could be utilized with the CLASP system 10. For example, a bin 144 of tape 20 could be used as shown in FIG. 7A to achieve more recording time without having to replace the tape 20 than might otherwise be achievable with a cartridge style configuration. Similarly, FIG. 7B illustrates an endless loop of tape 20 that is configured in a spool 146 which will typically also provide more recording time before replacement is necessary than might ordinarily be the case with an endless loop tape cartridge.

As shown in FIGS. 8A and 8B, the endless loop of tape 20 may also be fixedly attached to a cup or drum 148. As shown in FIG. 8A, the tape 20 could be formed in an endless loop (with or without a seam 14a) and fitted to the cup or, alternatively, as shown in FIG. 8B, it be placed on the cup and then welded or otherwise connected together to form an effectively seamless connection 150. Of course if a second recording surface was desired, a piece of tape 20 could also be affixed to the inside surface 152 of the cup 148.

Another alternative embodiment utilizes magnetic recordable coated surfaces to provide for recording surfaces. In other words, the analog recordable medium used with the CLASP system 10 would not have to be limited to magnetic tape 20. Rather, a cup 154, such as that illustrated in FIGS. 9A and 9B, could be coated directly with a magnetic recordable coating as opposed to strapping ferrous oxide (FeO) coated tape 20 around the cup. In the embodiment shown in FIGS. 9A and 9B, the record, playback, and erase heads 60, 62, 64, are positioned to contact the interior surface 156 of the spinning cup 154, but could equally be positioned to contact the outside surface 158 of the cup 154. Additionally, in other embodiments, the heads themselves could spin and the cup 154 remain stationary.

Figure 10A:
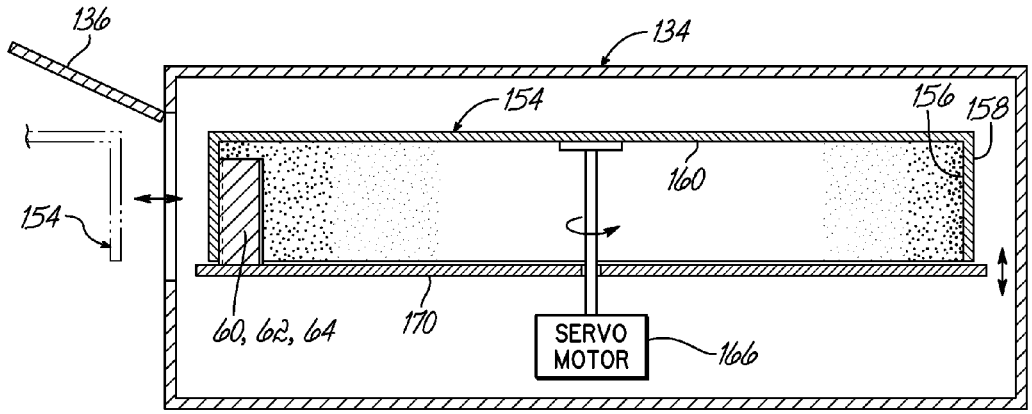
FIG. 10A is a diagrammatic cross sectional view of an embodiment of the present invention shown in FIGS. 4, 9A, and 9B.
Figure 10B:
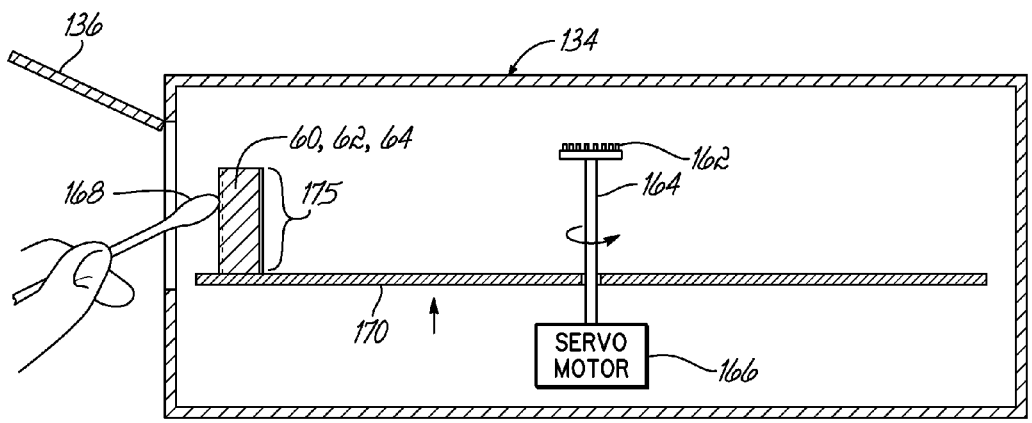
FIG. 10B is a diagrammatic cross sectional view of FIGS. 4, 9A, 9B and 10A showing the ability to clean the heads.
Figure 10C:
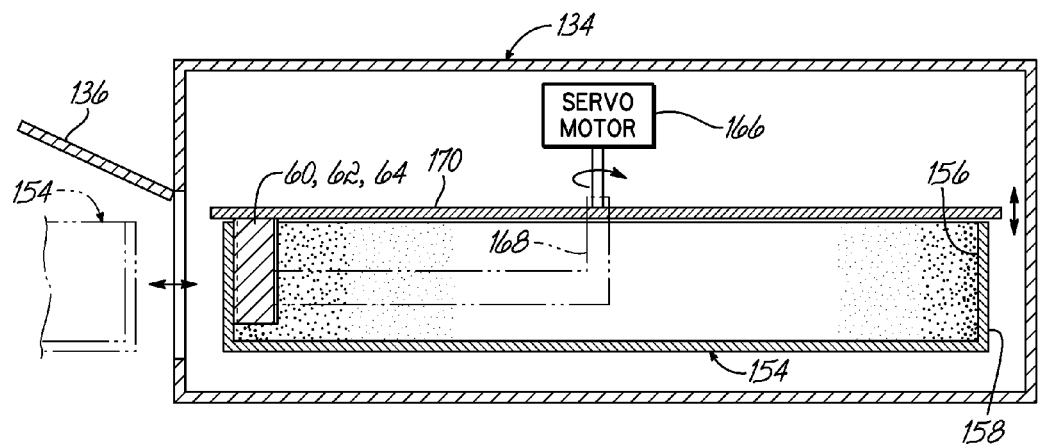
FIG. 10C is a diagrammatic cross sectional view of an alternative embodiment of FIGS. 4, 9A, 9B, 10A and 10B.

FIGS. 10A, 10B, 10C, 10D, and 10E further illustrate the CLASP unit 134 that is adapted to receive the recordable cup 154 through the door 136. The base 160 of the recordable cup 154 is adapted to operationally connect to a connector 162 that is attached to an axial or drive shaft 164 which is operable contact with a servo motor 166. The axial 164 is adapted to move up and down as needed to facilitate the loading and unloading of the recordable cup 154. Additionally, as shown, when the recordable cup 154 is not in the CLASP unit 134, the heads 60, 62, 64 are exposed which allows for easy cleaning with an appropriate cleaner 168. In the embodiments shown in FIGS. 10A and 10B, the heads 60, 62, 64 are attached to a base plate 170 and the servo motor 166 spins the cup 154. However, as shown in FIG. 10O, the servo motor 166 is attached to the base plate 170, or alternatively to an arm 168, which is connect to the heads 60, 62, 64 whereby the heads 60, 62, 64 spin and the cup 154 remains stationary. While FIG. 10C illustrates the servo motor 166 being above the cup 154, it could also equally be positioned below the cup, as in FIGS.

10A and 10B, with the base plate 170, or alternatively to the arm 168, connecting to the heads 60, 62, 64.

Figure 10D:
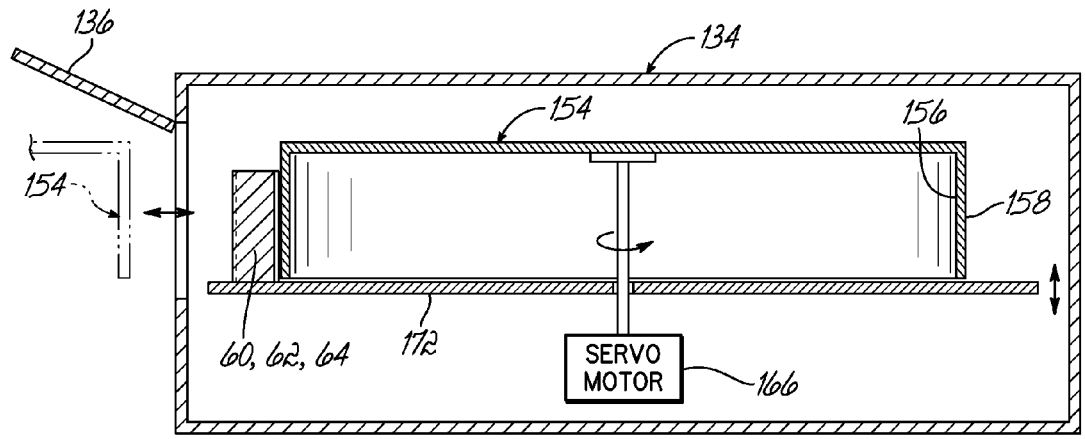
FIG. 10D is a diagrammatic cross sectional view of an alternative embodiment of FIGS. 4, 9A, 9B, 10A, 10B and 10C.
Figure 10E:
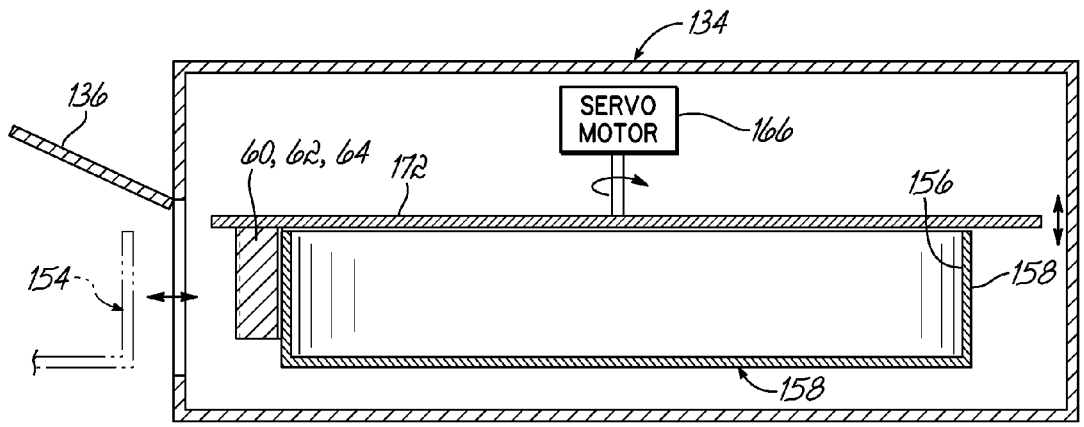
FIG. 10E is a diagrammatic cross sectional view of an alternative embodiment of FIGS. 4, 9A, 9B, 10A, 10B, 10C and 10D.

FIGS. 10D and 10E illustrate an embodiment wherein the heads 60, 62, 64 are positioned so as to interact with the outside surface 158 of the cup 154. In FIG. 10D, the servo motor 166 operationally attaches to the base 160 of the cup 154 and spins the cup 154. However, in the embodiment shown in FIG. 10E, the servo motor 166 operationally attached to the base plate 172 which in turn is attached to and spins the heads 60, 62, 64.

Figure 11A:
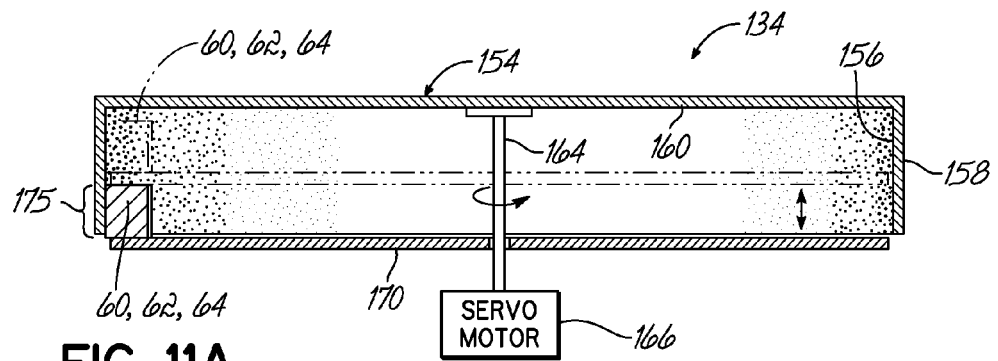
FIG. 11A is a diagrammatic cross sectional view of an alternative embodiment of FIGS. 4, 9A, 9B, 10A, 10B, 10C, 10D and 10E.
Figure 11B:
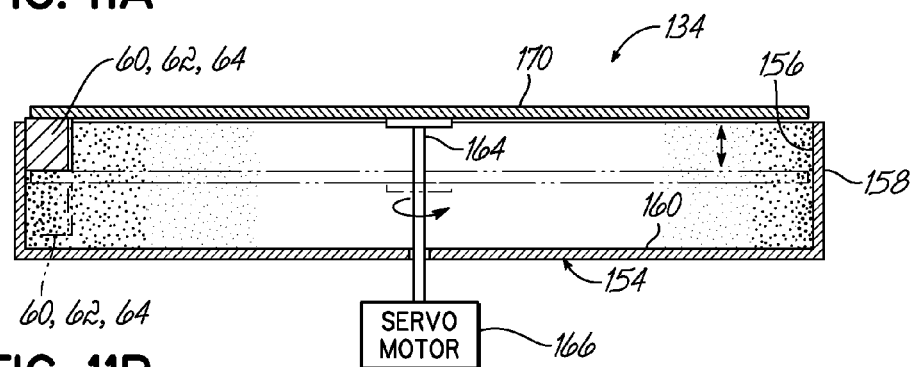
FIG. 11B is a diagrammatic cross sectional view of an alternative embodiment of FIGS. 4, 9A, 9B, 10A-10E, and 11A.
Figure 11C:
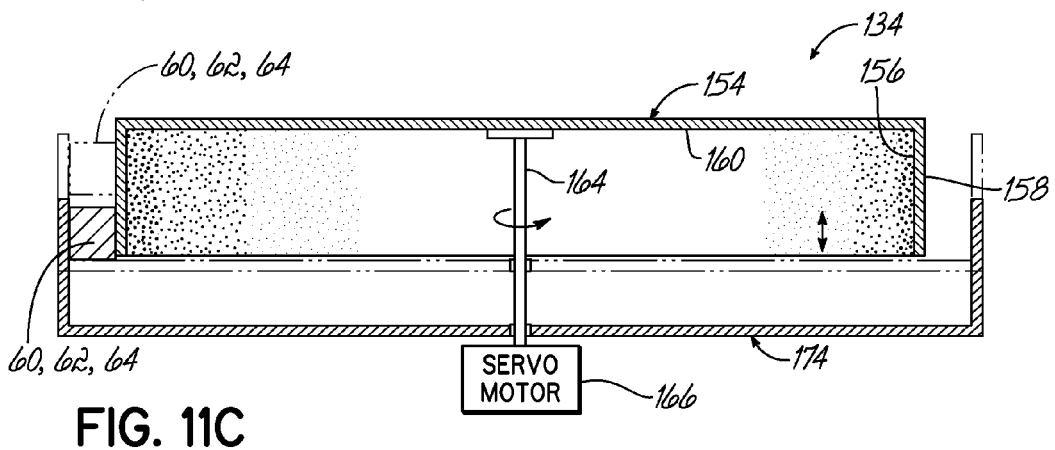
FIG. 11C is a diagrammatic cross sectional view of an alternative embodiment of FIGS. 4, 9A, 9B, 10A-10E, 11A, and 11B.
Figure 11D:
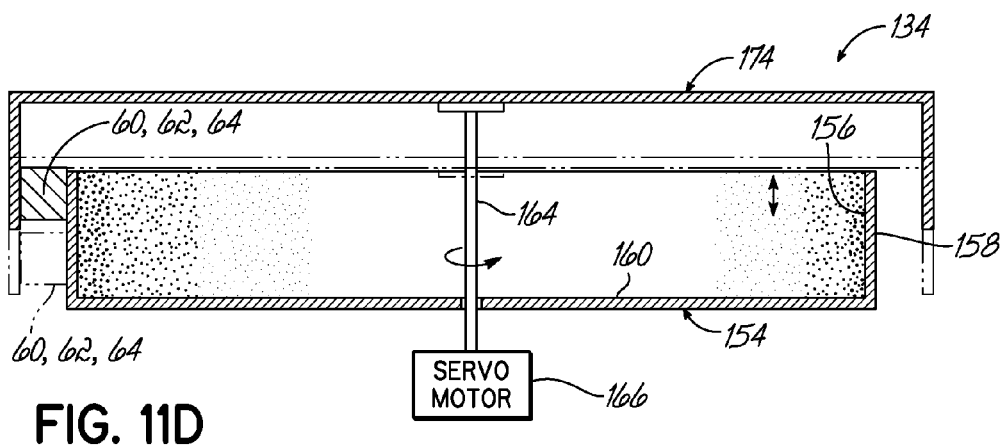
FIG. 11D is a diagrammatic cross sectional view of an alternative embodiment of FIGS. 4, 9A, 9B, 10A-10E, 11A, 11B, and 11C.

FIGS. 11A, 11B, 11C, and 11D further illustrate alternative embodiments of the CLASP system 10 using the recordable cup 154. As shown in FIG. 11A, the servo motor 166 is attached to the base 160 of the cup 154 but the heads 60, 62, 64 only extend along a portion of the height of the inside surface 156. As shown in FIG. 11A, the base plate 170 is adapted to move up and down to facilitate the movement of the heads 60, 62, 64 to a different recordable portion of the inside surface 156. Alternatively, in the embodiment shown in FIG. 11B, the servo motor 166 is attached via the axial 164, which is adapted to move up and down, to the base plate 170 whereby the heads 60, 62, 64 are moved to a different recordable portion of the inside surface 156. In the embodiments shown in FIGS. 11C and 11D, the heads 60, 62, 64 are positioned so as to interact with the exterior surface 158 of the cup 154. In the embodiment shown in FIG. 11C the servo motor 166 spins the cup 154 whereas in the embodiment shown in FIG. 11D, the servo motor 166 spins the heads 60, 62, 64 via the connecting inverse cup member 174.

Typically, the cup 154 may have a diameter of about 15 inches to facilitate its use in a 19 inch rack, and will have interior/exterior surfaces 156/158, i.e., the lip 173 of the cup 154, with a height of about an ⅛, ¼, ½, 1, or 2 inches. However, other dimensions may also be used and it can be appreciated by those skilled in the art that by varying the diameter of the cup 154, as well as the height of the lip 173 additional recording time may be achieved. Similarly, varying sizes of heads 60, 62, 64, e.g., ⅛, ¼, ½, 1, or 2 inch, may be used depending on the number of tracks a user may desire to be simultaneously recorded. And when a small head 60, 62, 64, is used, i.e., a head 60, 62, 64, with a short height 175, additional record time may be achieved before having to replace the cup 154.

Figure 12A:
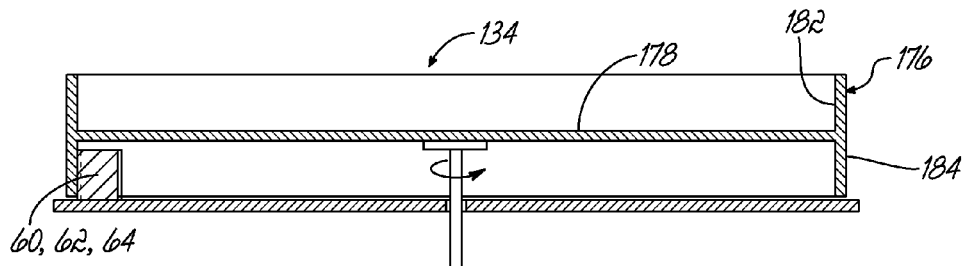
FIG. 12A is a diagrammatic cross sectional view of an alternative embodiment of FIGS. 4, 9A, 9B, 10A-10E, and 11A-11D.
Figure 12B:
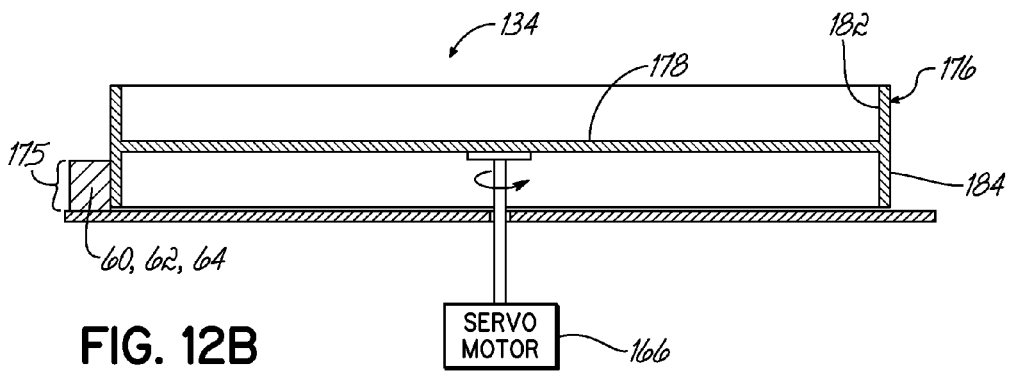
FIG. 12B is a diagrammatic cross sectional view of an alternative embodiment of FIGS. 4, 9A, 9B, 10A-10E, 11A-11D, and 12A.

FIGS. 12A and 12B show yet another embodiment of a recordable medium for use in the CLASP system 10. This H-shaped medium 176 had the servo motor 166 attached to a mid-panel 178 which allows for an upper and a lower recordable surfaces 180, 182. The heads 60, 62, 64 may alternatively be position on the outside 184 of the H-shaped medium 176, as shown in FIG. 12B. Additionally, the heads 60, 62, 64 may, within the same embodiment, be repositioned so as to record on both the interior and the exterior surfaces of the recordable medium.

Figure 13A:
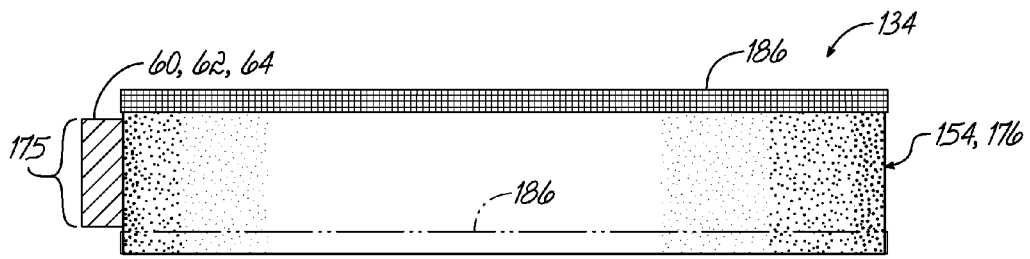
FIG. 13A is a diagrammatic partial cross sectional view of an alternative embodiment of FIGS. 4, 9A, 9B, 10A-10E, 11A-11D, 12A and 12B.
Figure 13B:
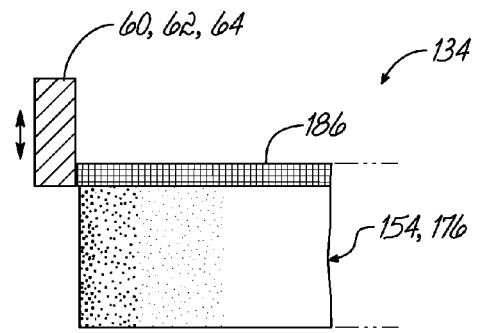
FIG. 13B is a diagrammatic partial cross sectional view of an alternative embodiment of FIGS. 4, 9A, 9B, 10A-10E, 11A-11D, 12A, 12B, and 13A.

In another embodiment of the present invention shown in FIGS. 13A and 13B, the recordable medium may be have a portion of its surface that contacts the head 60, 62, 64 to be devoted to a head cleaning strip 186. Hence, as the head 60, 62, 64 spin or the cup 154 or H-shaped medium 176 spins, typically prior to beginning a recording session, the cleaning strip 186 passes over the heads 60, 62, 64 and cleans them.

Figure 14A:
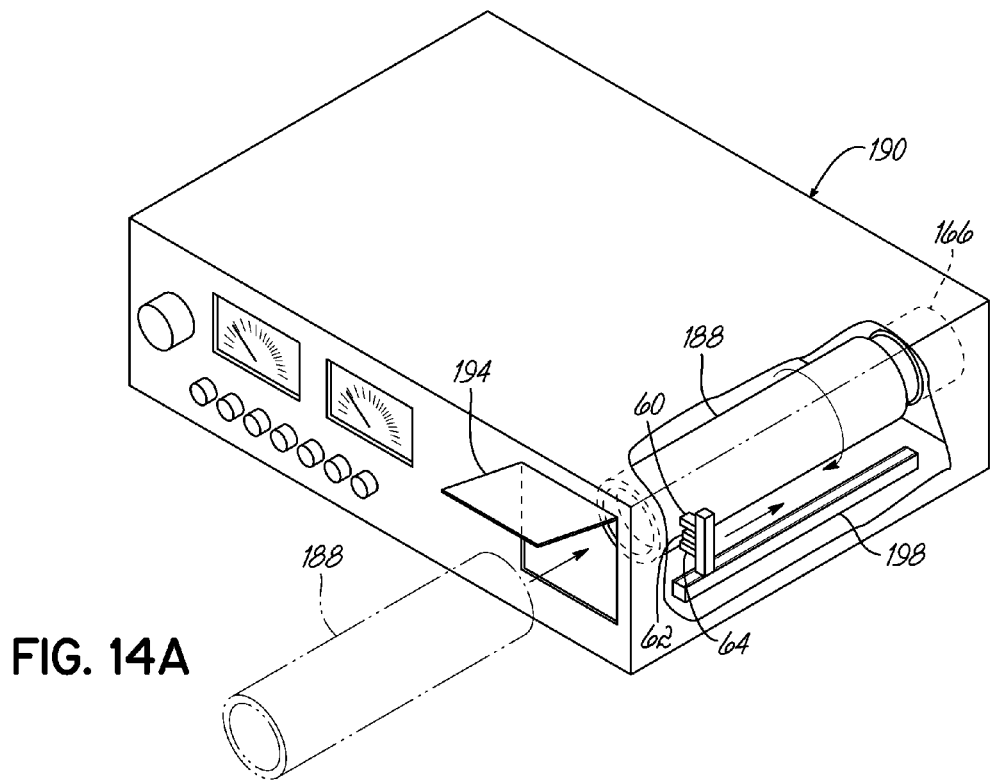
FIG. 14A is a perspective view of an alternative embodiment of the present invention.
Figure 14B:
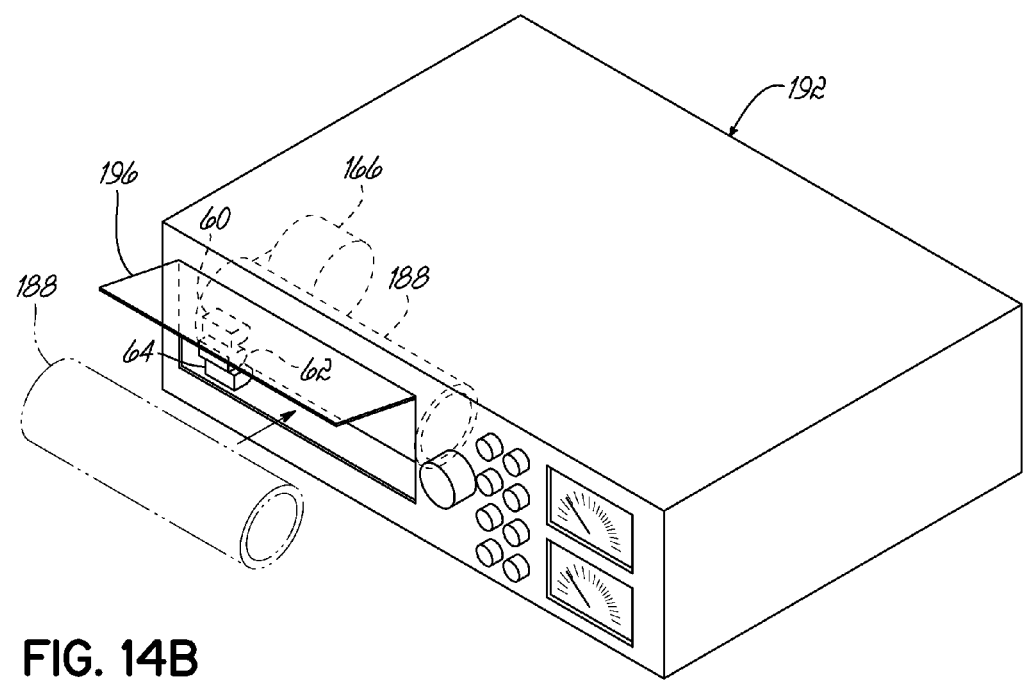
FIG. 14B is a perspective view of an alternative embodiment of the present invention shown in FIG. 14A.

Additional forms of recordable medium may be utilized in still further embodiments of the CLASP system 10. For example, in the embodiments shown in FIGS. 14A and 14B, an analog recordable cylinder 188 is shown in the CLASP unit 190, 192. The cylinder 188 is loaded through a door 194, 196 and is rotated by a servo motor 166. The record, playback, and erase heads 60, 62, 64 are typically position on a rail 198 for lateral movement as the cylinder 188 spins. Alternative methods of moving the heads 60, 62, 64, such as via a telescoping arm 199 (shown in FIGS. 15A & 15B), may also be utilized. The CLASP units 190, 192 will typically be rack mountable.

Figure 15A:
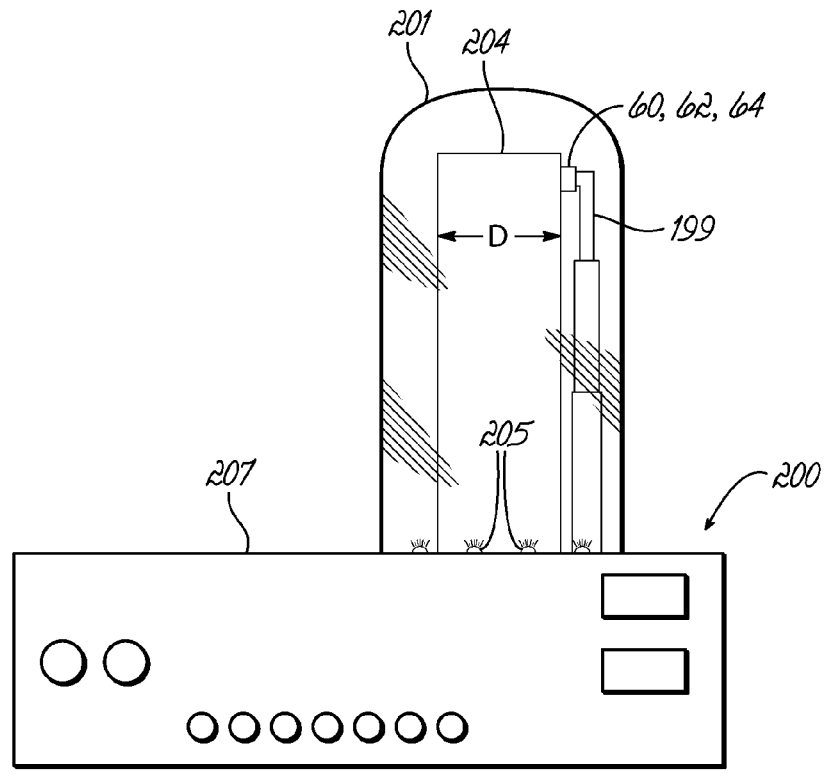
FIG. 15A is a front view of an alternative embodiment of the present invention.
Figure 15B:
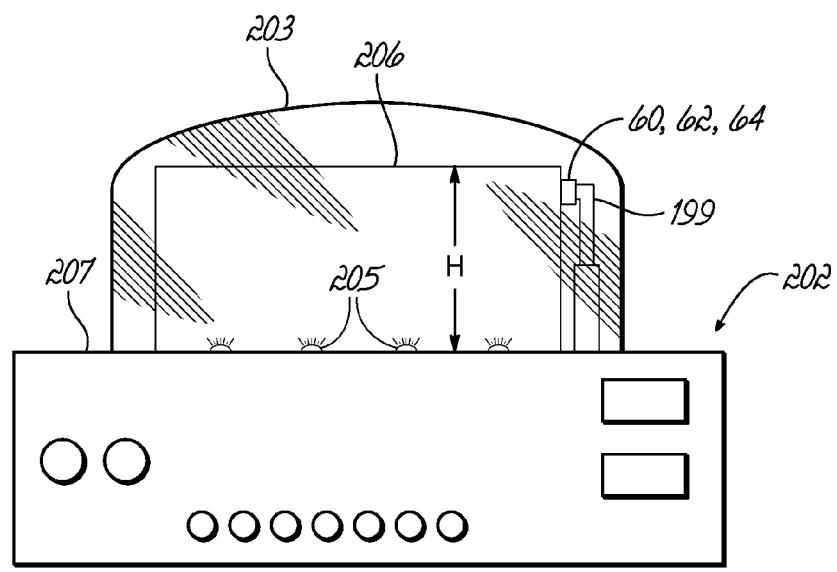
FIG. 15B is a perspective view of an alternative embodiment of the present invention shown in FIG. 15A.

FIGS. 15A and 15B show another embodiment of CLASP units 200, 202 which also utilize an analog recordable drum 204, 206. In these embodiments, the heads 60, 62, 64 are positioned on a telescoping arm 199 for vertical movement as the drum 204, 206 spin. The drum 204, 206 is typically enclosed in a transparent housing 201, 203, e.g., made out of clear plastic or glass, to allow visual monitoring of the drum 204, 206 as it spins. The housing 201, 203 may further be illuminated with lights, e.g., light-emitting diodes ("LEDs") 205, positioned in the top 207 of the CLASP units 200, 202. Such illumination may allow a user to better view the drum 204, 206 in low light conditions as well as create an ascetically pleasing visual presentation. It can be appreciated by those skilled in the art that by increasing the recordable surface area of the drum 204, 206, i.e., by increasing the height ("H") and/or diameter ("D") of the drum 204, 206, that additional recording time may be achieved prior having to replace the recordable medium.

Figure 16:
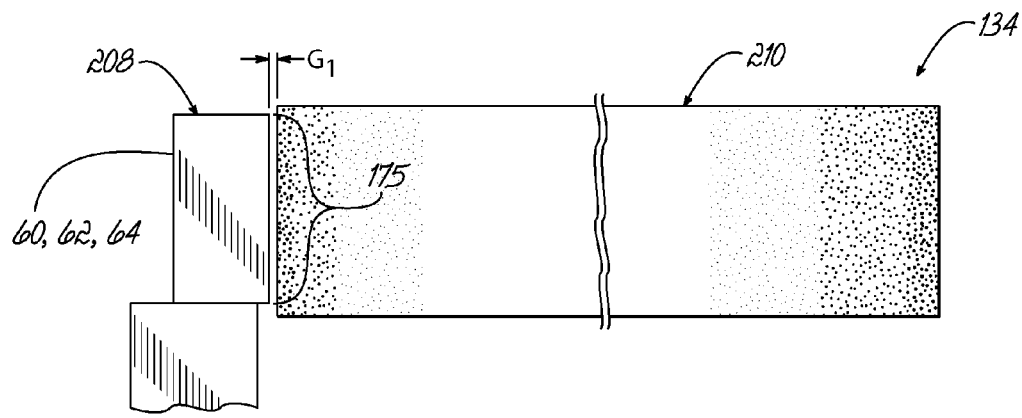
FIG. 16 is a diagrammatic side view of a recordable medium for use in an embodiment of the present invention shown in FIG. 4.

In order to further the useful life of the recordable medium used in the CLASP system 10, in other embodiments a flying head 208, such as shown in FIG. 16 may be utilized. By using a flying head 208, the heads 60, 62, 64 never actually contact the recordable medium 210 but are separated by a gap ("G1"). Typically, this distance will be less than 5 millionths of an inch in order to not adversely affect the fidelity of the recording. This helps to keep the ferrous oxide (FeO) or other like recordable coating from eroding away from the surface of the recordable medium 210.

Figure 17:
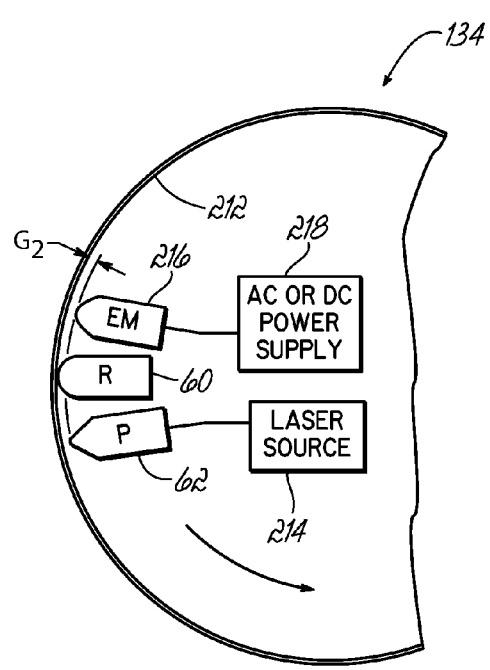
FIG. 17 is a diagrammatic top view of another embodiment of the present invention shown in FIG. 4.

Alternatively, as shown in FIG. 17, in order to minimize the erosion of the recordable coating from the surface of the recordable medium 210 in the CLASP system 10, the record head 60 may contact the surface 212 of the recordable medium while the playback head 62, separated from the surface 212 by a gap ("G2"), reads its signal via a laser source 214 and an electro-magnet 216, also separated from the surface 212 by a gap ("G2"), connected to an alternating current ("AC") or direct current ("DC") power supply 218, is used to erase the recordable medium prior to recording over the same surface again. The use of an AC electro-magnet 216 may be desirous to reduce unwanted noise.

Figure 18:
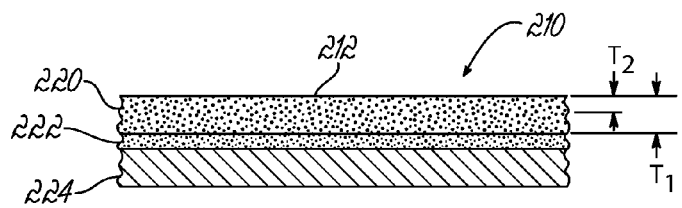
FIG. 18 is a partial cross sectional view of an enlarged section of a recordable medium for use in the present invention.

Finally, in order to increase the recording time prior to having to replace the recordable medium 210 in the CLASP system 10, when recordable medium 210 other than tape 20 is used, i.e., by using more rigid recordable medium, such as made out of plastic, as shown in FIG. 18, a thicker layer ("T1") of ferrous oxide 220 may be utilized than the thickness ("T2") that is traditionally used on tap 20. While an adhesive 222 will typically still be needed, the pliable but more sturdy backing 224 may allow for thicker coats of ferrous oxide than would be permitted on a tape 20, thus increasing the number of times such a surface may be used for recording.

Figure 19:
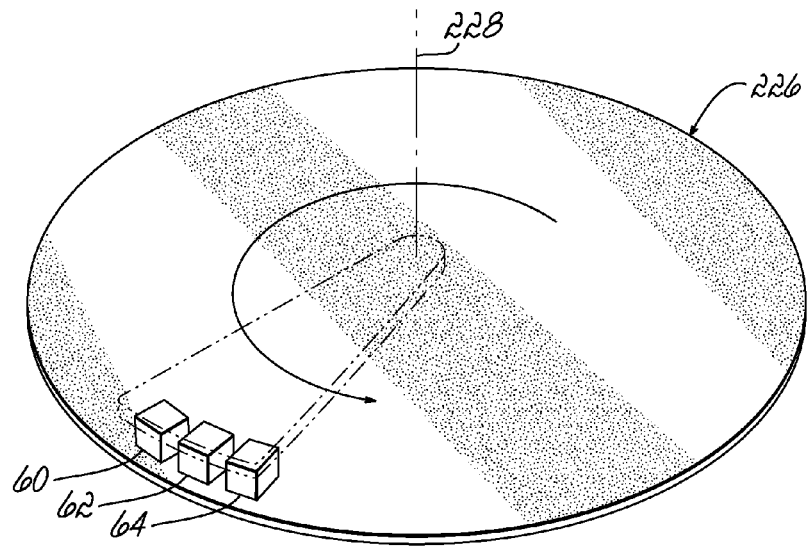
FIG. 19 is a diagrammatic perspective view of another embodiment of the present invention.

A disk 226, such as shown in FIG. 19, is yet recordable medium that may be used in the CLASP system 10. Both sides of the disk 226 may be coated so as to provide a recordable surface. As with other embodiments, the heads 60, 62, 64 may rotate or the disk 226 may rotate. Here, there will need to be additional latency monitoring and calculations as the heads 60, 62, 64 move towards the center 228 of the disk 226.

Figure 20:
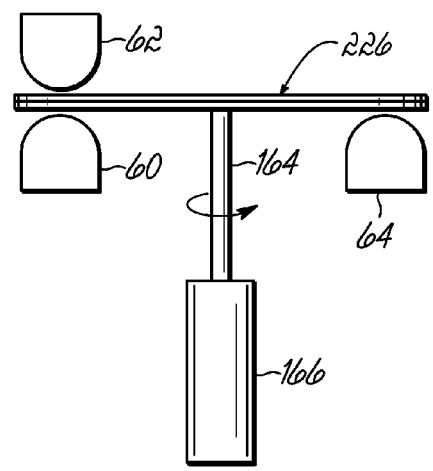
FIG. 20 is a diagrammatic side view of another embodiment of the present invention.

As shown in FIG. 20, the disk 226 may also be used in the CLASP system 10 as a rotating disk flux field randomizer. Here, the magnetic field from record head 60 passes through the rotating magnetic medium disk 226 and is picked up by the playback head 62. The rotation of the disk 226 causes randomness to the audio signal similar to the type associated with traditional reel-to-reel analog tape recorders. The erase head 64 will erase any stray noise that is picked up on the disk 226 every rotation cycle. This embodiment would typically allow for very long, if not potentially indefinite use of the disk 226 without concern for degradation due to wear. Because the record and playback heads 60, 62 are positioned opposite one another as opposed to laterally as shown in the other embodiments, the time delay is eliminated and latency monitoring is unnecessary.

Figure 21:
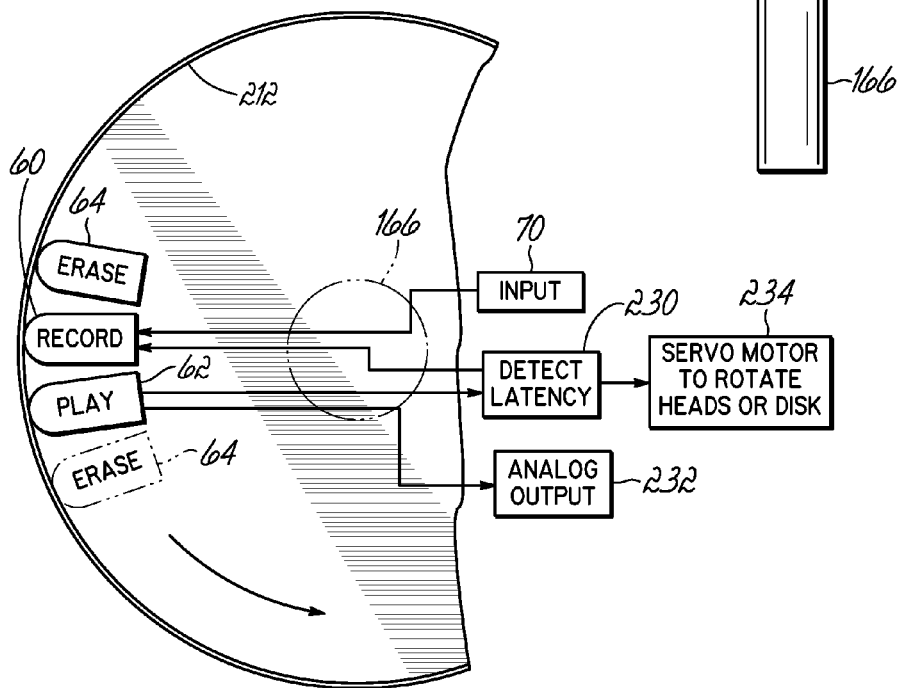
FIG. 21 is a diagrammatic view an embodiment of the present invention.

FIG. 21 illustrates the process of latency detection whereby the CLASP system 10 can synchronize the latency of the recorder, e.g., an analog recorder's entire signal path for any given recordable medium speed, head gap, DSP, and sample rate. As shown, an input signal 70 is feed to the record head 60 and imparted to the surface 212 of the recordable medium. A latency detection module 230 also feeds a latency detection signal to the record head 60. Typically this is done by transmitted an array of pulses. The playback head 62 reads both the latency detection signal(s) and transmits it back to the latency detection module 230. The playback head 62 also reads the recorded input signal 70 and transmits that to the analog output 232. The latency detection module 230 in turn communicates with the servo motor 166 to appropriately rotate the heads 60, 62, 64 or the recordable medium, e.g., the cup, cylinder, drum, disk, etc. 234.

Figure 22:
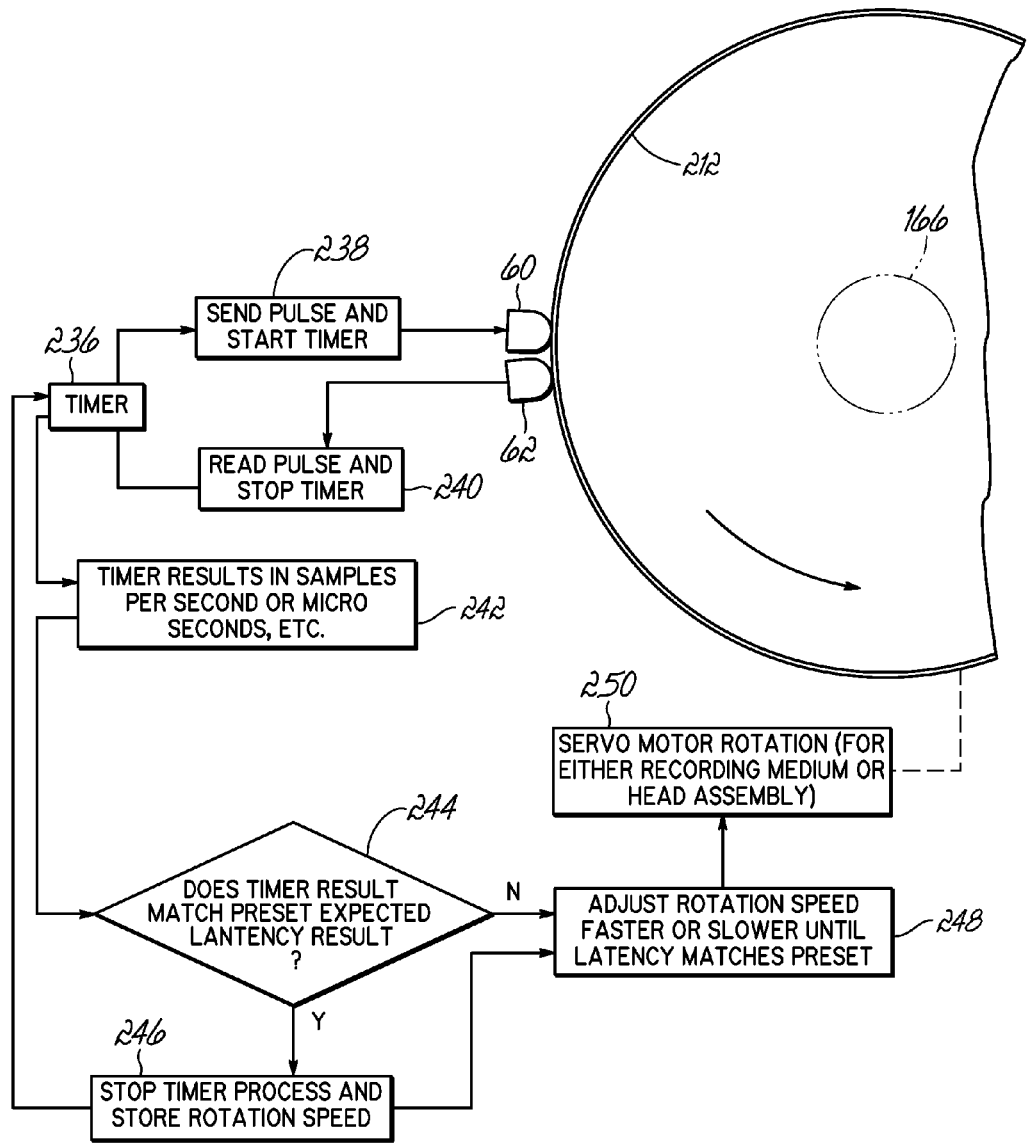
FIG. 22 is a diagrammatic view an embodiment of the present invention.

The latency detection process is further illustrated in FIG. 22. The process begins when a pulse or pulses, e.g., an array of 30 pulses, is sent to the record head 60 and the timer 236 is started 238. The playback head 62 reads the pulse or pulses off of the surface 212 of the recordable medium and the timer is stopped 240. This process results in samples per second or micro seconds 242. This sample is then compared to a preset expected latency result 244. If the sample result falls within the expected latency results, the process is ended and the rotation speed of the recordable medium is stored 246. If the sample result falls outside the expected latency results, the rotation speed of the servo motor 166 is adjusted faster or slower until the latency matches the expected preset result 248, 250.

Figure 23A:
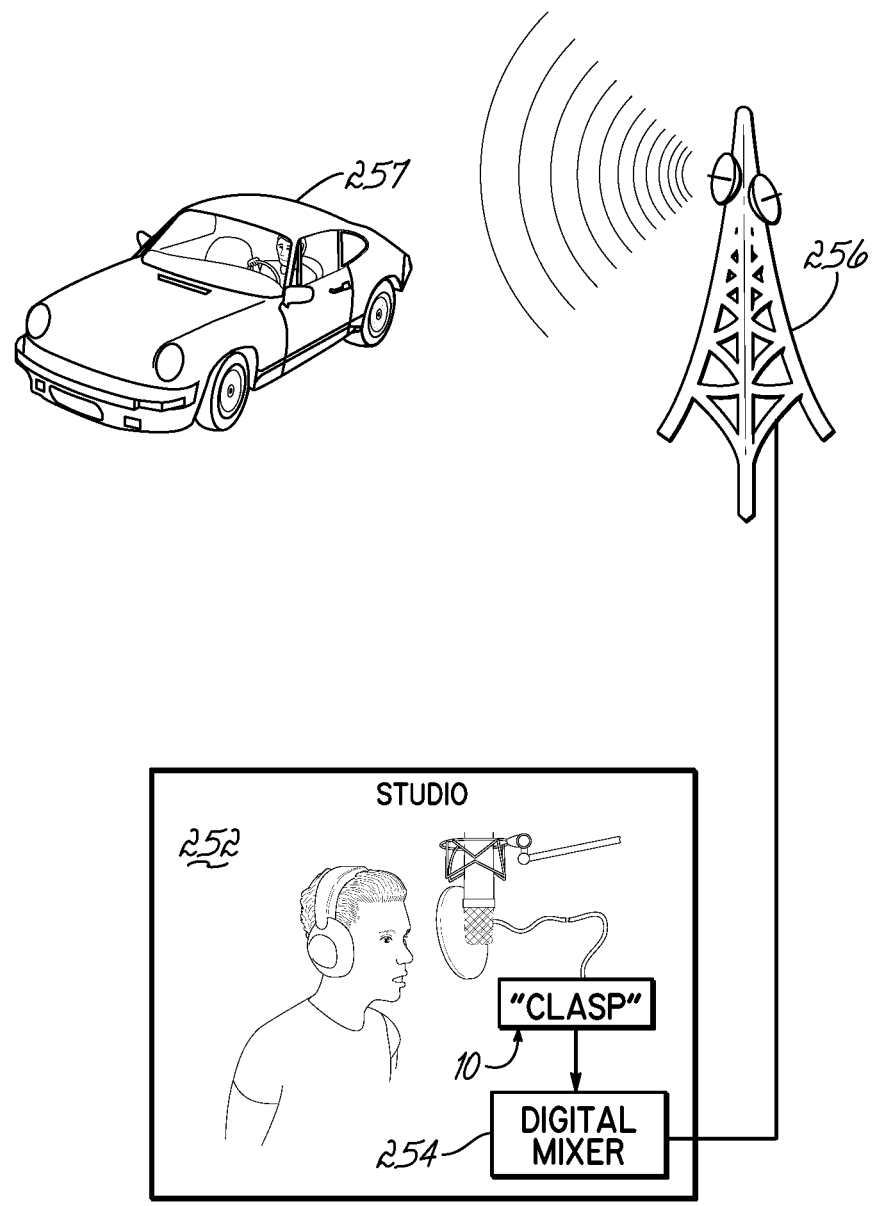
FIG. 23A is a diagrammatic block diagram view an embodiment of the present invention.
Figure 23B:
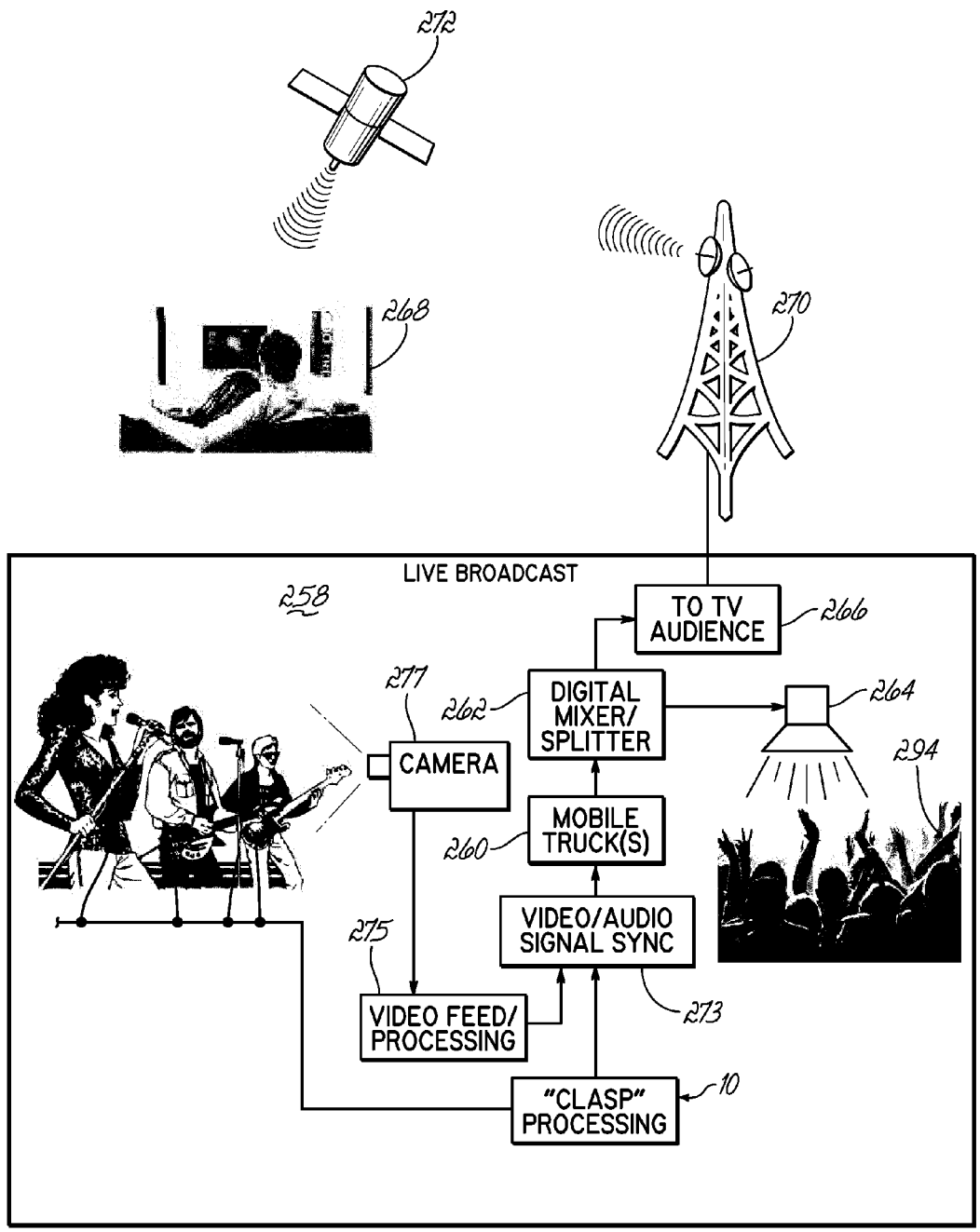
FIG. 23B is a diagrammatic block diagram view an embodiment of the present invention.

In operation, the CLASP system 10 may be used in a variety of applications. For example, as shown in FIG. 23A, the CLASP system 10 may be used in a studio 252 environment prior to sending signals to a digital mixer 254 for broadcast via an antenna 256 to a radio audience 257. Additionally, as shown in FIG. 23B, the CLASP system 10 may be used in a live concert 258 environment prior to the signal(s) being processed in mobile trucks 260, digitally mixed and split 262 for transmission to a live audience 264 and broadcast to a television ("TV") audience 266 at home 268. These transmission chains may utilize a variety of towers 270, satellites 272, and/or cables. In addition, the CLASP system 10 may be synchronized 273 with the SMPTE time codes of the TV video feed/processing 275 from the TV camera 277 so that the video induced time delay and the time delay induced by the CLASP system 10 are synchronized prior to transmission to the TV audience 266.

Figure 23C:
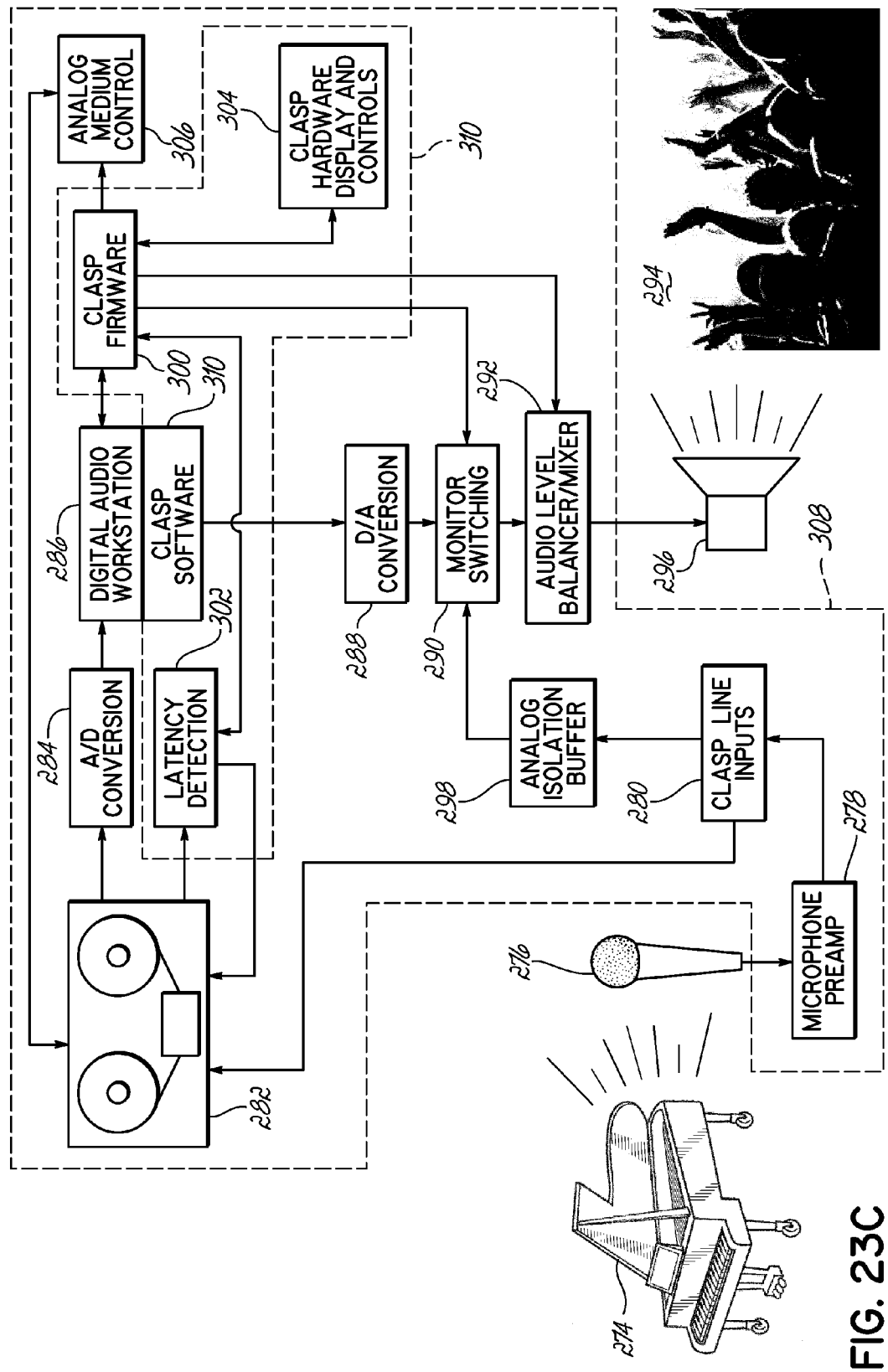
FIG. 23C is a diagrammatic block diagram view an embodiment of the present invention.

As shown more specifically in FIG. 23C, an audio sound, e.g. from an instrument 274, is received by a microphone 276 and passes through a microphone preamp 278 and to one of the CLASP line inputs 280. The signal is then sent to an analog medium input of an analog recording medium device 282. The reproduction or playback signal from the recorder 282 is sent to an analog to digital ("A/D") converter 284 and then onto a DAW 12 running CLASP software 286. The signal then passes through a digital-to-analog ("D/A") converter 288, through a monitor switch 290, an audio level balancer/mixer 292, and to a live audience 294 via a speaker 296.

The CLASP line inputs 280 also sends a signal to an analog isolation buffer 298 which also feeds a signal to the monitor switch 290. Additionally, the CLASP firmware 300 controls the process of latency detection 302 in conjunction with the recorder 282. The CLASP firmware 30 is also in communication with the DAW 12 and CLASP software running thereon 286, the monitor switch 290, the audio level balancer/mixer 292, the CLASP hardware display and controls 304, and the analog medium control 306, which in turn is in turn in operable communication with the recorder 282.

Figure 24A:
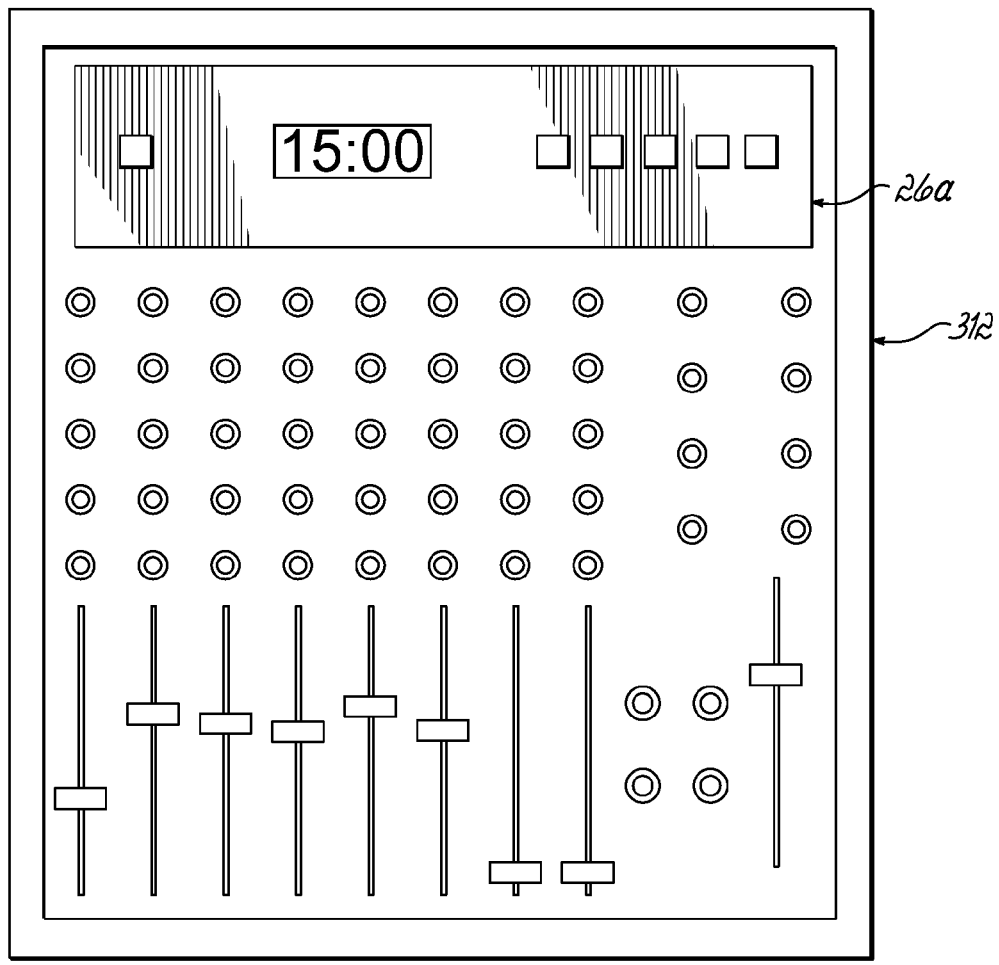
FIG. 24A is a diagrammatic top view of a mixing board embodiment of the present invention.
Figure 24B:
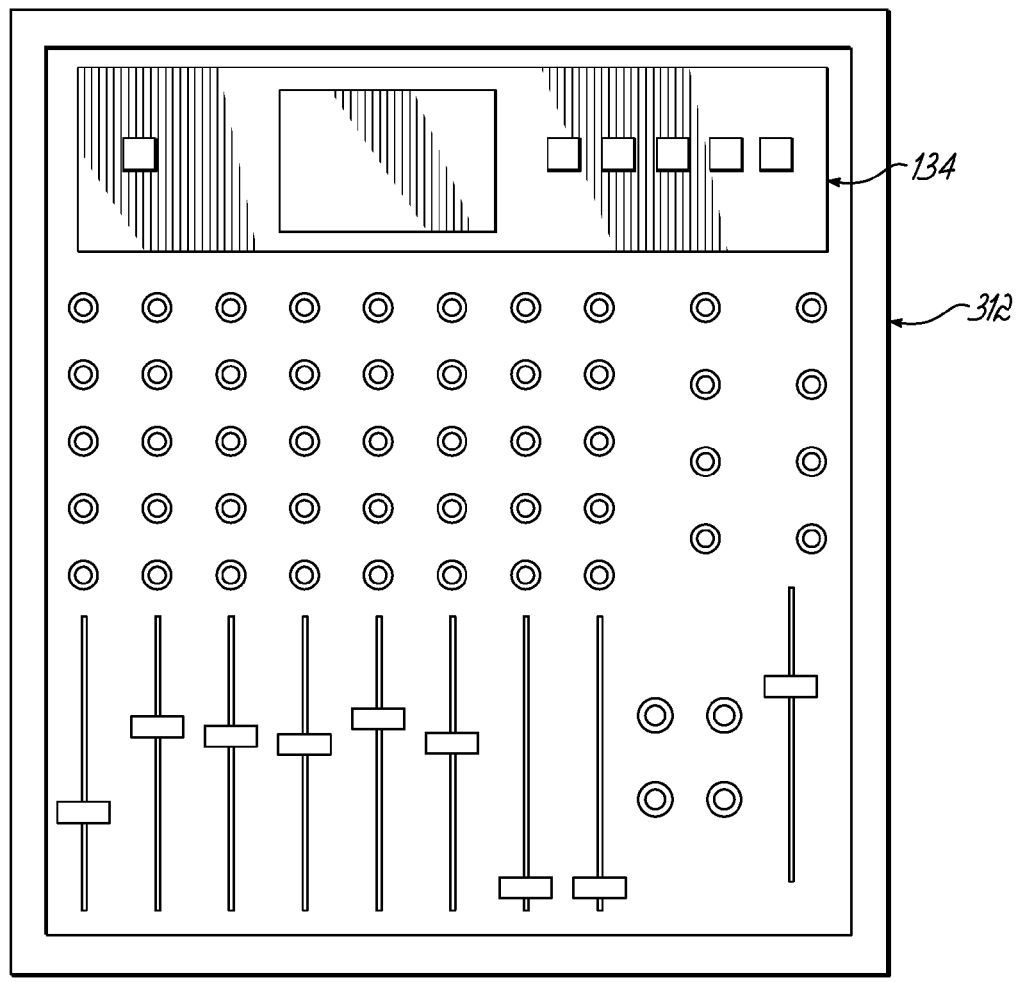
FIG. 24B a diagrammatic top view of a mixing board embodiment of the present invention.
Figure 25A:
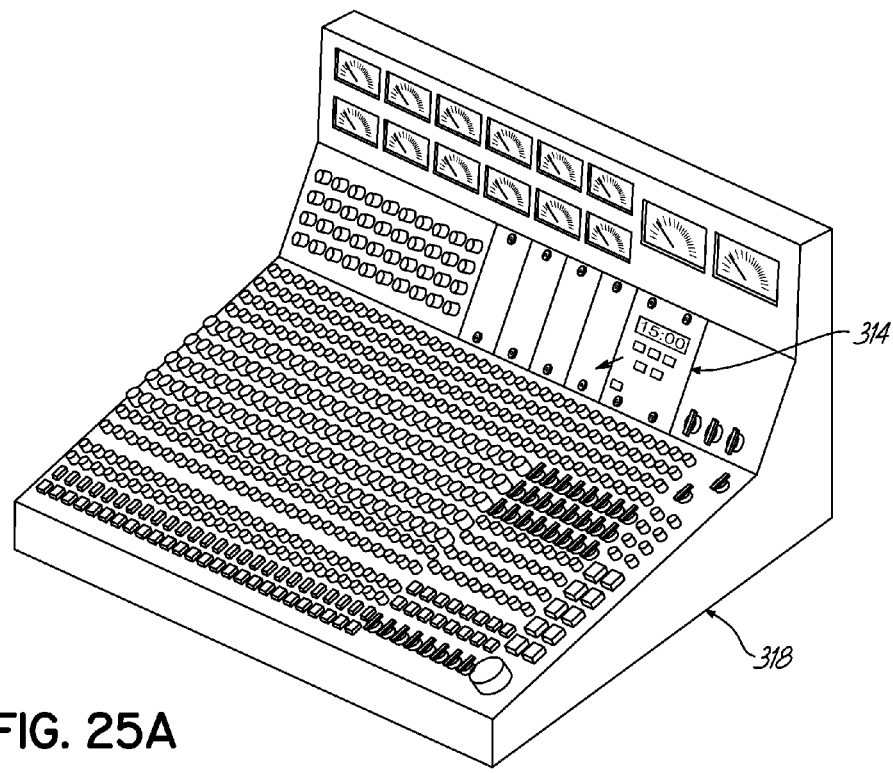
FIG. 25A is a diagrammatic perspective view of a mixing board embodiment of the present invention.
Figure 25B:
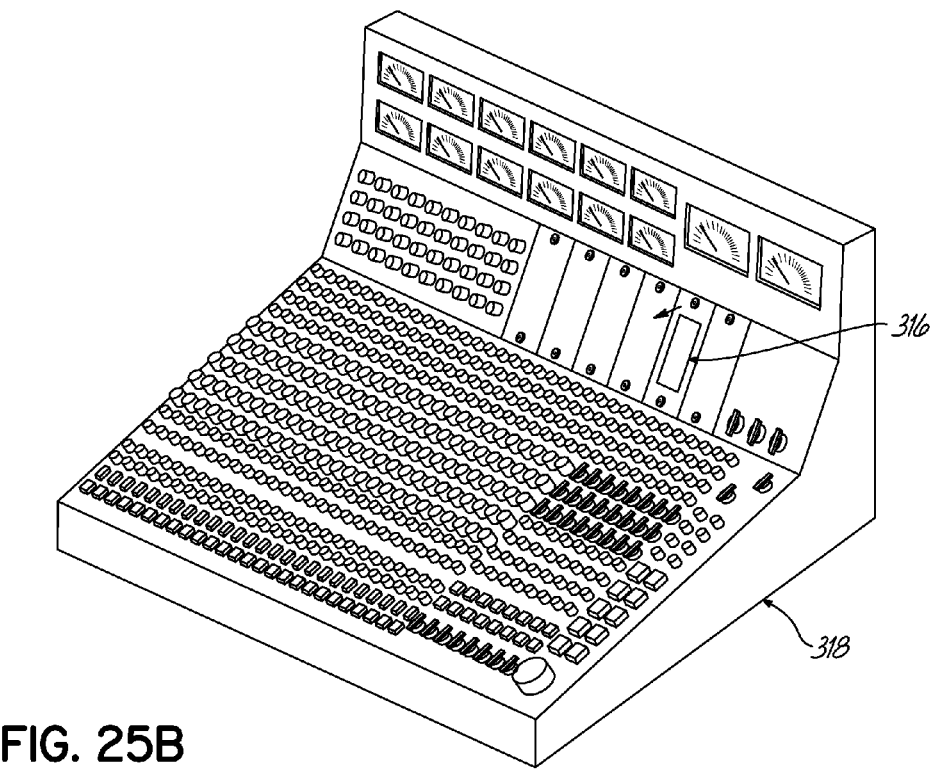
FIG. 25B is a diagrammatic perspective view of a mixing board embodiment of the present invention.

Various components may be included within various CLASP systems 10 depending on the desired configurations. For example, in one embodiment, one CLASP system 10 could be defined by the components outlined by line 308. In alternative embodiments, the system could be defined by the components outlined by line 310. In still further embodiments, such as shown in FIGS. 24A and 24B, the CLASP units 26a, 134 could be integral to a recording or mixing console 312, such as those manufactured by Solid State Logic ("SSL"), located in Oxfordshire, England, for use by film, audio, video, and broadcast professionals. In other embodiments, such as those shown in FIGS. 25A and 25B, the functionality of the CLASP units 26a, 134 could be configured on removable cards 314, 316 for a mixing console 318, such as that manufactured by Automated Processes, Inc. ("API"), located at 8301 Patuxent Range Road, Jessup, Md. 20794.

Figure 26:
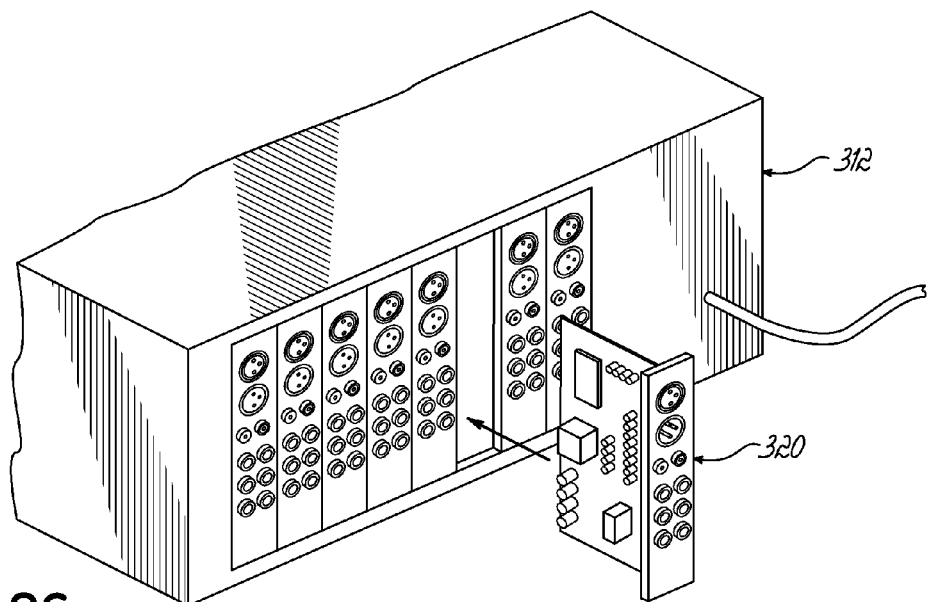
FIG. 26 is a diagrammatic rear perspective view of a simulator and use in the present invention shown in FIGS. 24A and 24B.

In yet further embodiments, such as shown in FIG. 26, a card 320 simulating a particular type of recorder or other component may be utilized in conjunction with the CLASP system 10. In other words, in addition to the rich sounds of an analog recording, such a card 320 will allow a user to capture those sounds as if they were originally recorded on a vintage analog tape recorder, e.g., a Stader 800, Ampex ATR 124, or a 3M Model No. M79.

Figure 27A:
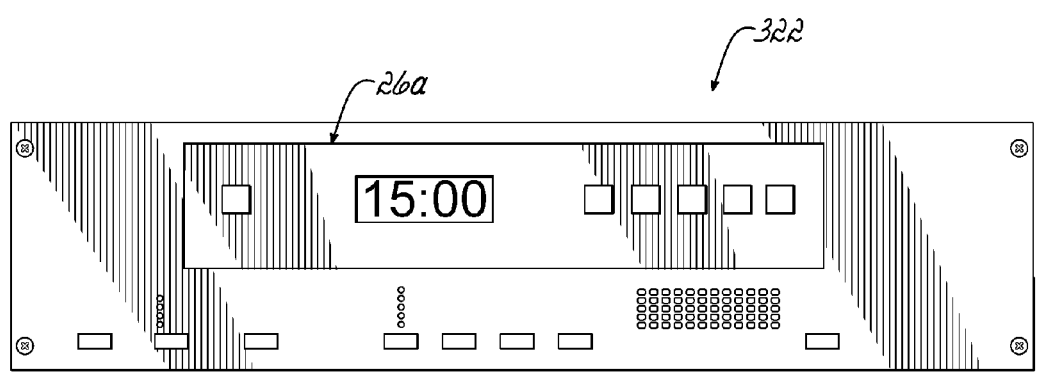
FIG. 27A is a diagrammatic front view of a convertor embodiment of the present invention.
Figure 27B:
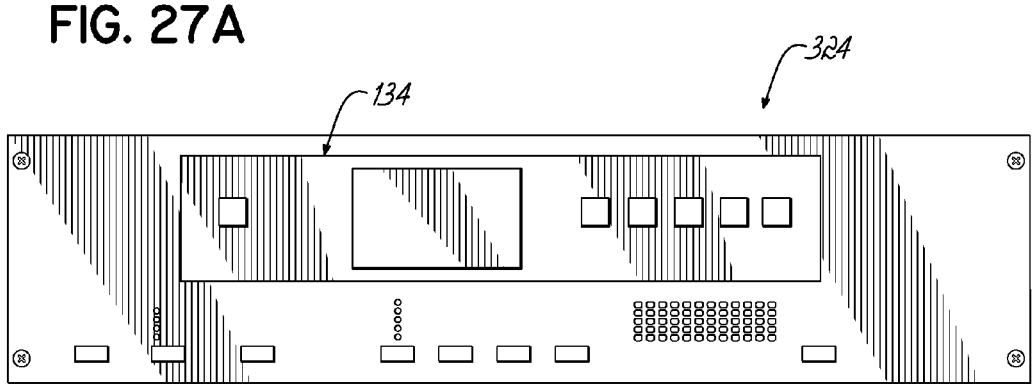
FIG. 27B is a diagrammatic rear view of a convertor embodiment of the present invention.
Figure 28:
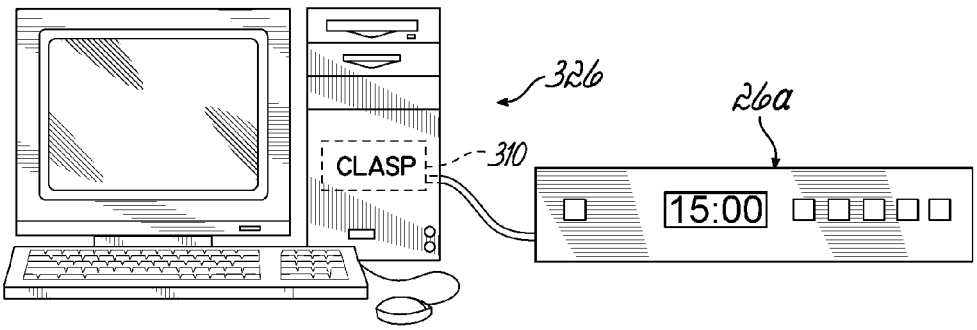
FIG. 28 is a diagrammatic perspective view of a digital audio workstation embodiment of the present invention.
Figure 29:
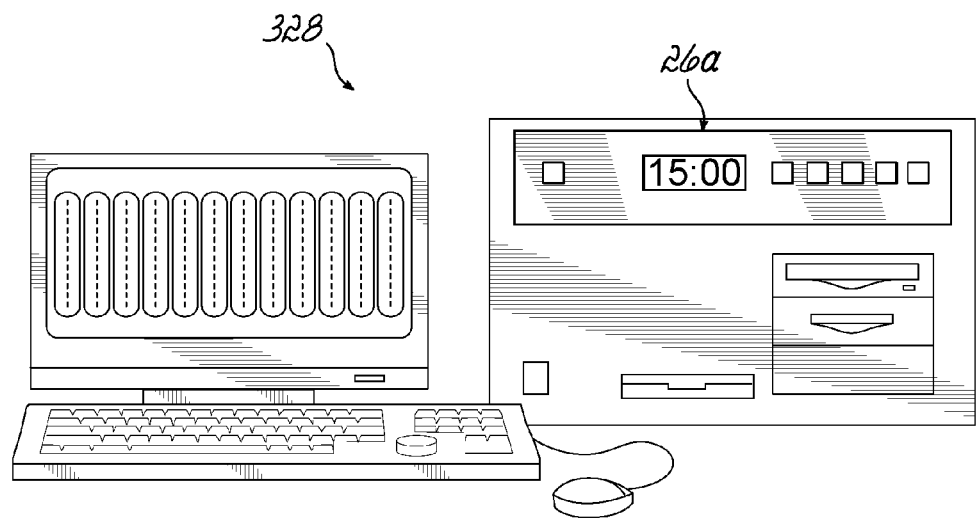
FIG. 29 is diagrammatic perspective view of a hard disk recorder embodiment of the present invention.
Figure 30:
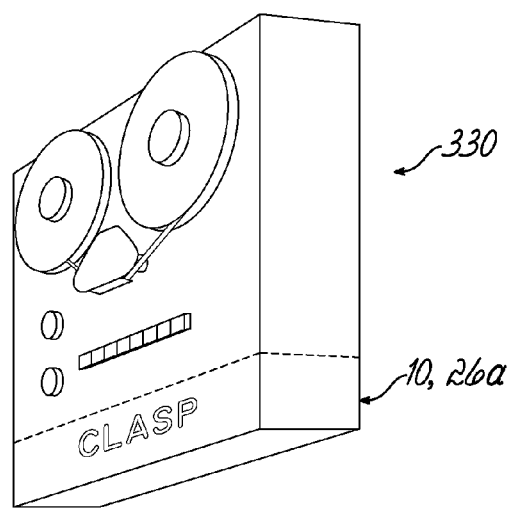
FIG. 30 is diagrammatic perspective view of a audio tape machine embodiment of the present invention.

As shown in FIGS. 27A and 27B, the CLASP unit 26a, 134 may be integral with an A/D convertor 322, 324 such as those manufactured by Apogee Electronics Corp., located at 1715 Berkeley Street, Santa Monica, Calif. 90404, Lynx Studio Technology, Inc., located at 190 McCormick Avenue, Costa Mesa, Calif. 92626-3307, or Avid Technology, Inc., located at One Park West, Tewksbury, Mass. 01876. Additionally, as shown in FIG. 28 the CLASP software plug-in 310 could be integral to a DAW 326 such as those identified herein or those manufactured by Roland Corporation, located at 5100 South Eastern Avenue, Los Angeles, Calif. 90040-2938, or by Apple Inc., located at 1 Infinite Loop, Cupertino, Calif. 95014. Similarly, as shown in FIG. 29, the CLASP system 10, or a CLASP unit 26a, 134, or components thereof may be integral to a standalone hard disk recorder 328 such as the RADAR hard disk recorder manufactured by iZ Technology Corporation, located at #240-109 Braid Street, New Westminster, British Columbia, Canada V3L 5H4. Finally, as shown in FIG. 30, the CLASP system 10 or a CLASP unit 26a or components thereof may be integral to a tape machine or tape deck 330 known to those skilled in the art or as discussed herein.

While the present invention has been illustrated by description of various embodiments and while these embodiments have been described in considerable detail, it is not the intention of the applicant to restrict or in any way limit the scope of the claims to such detail. Additional advantages and modifications will readily appear to those skilled in the art. The invention in its broader aspect is, therefore, not limited to the specific details, representative system, apparatus, and method, and illustrative example shown and described.

Accordingly, departures may be made from such details without departing from the spirit or scope of the applicant's general inventive concept.

What is claimed is:

1. A device for processing audio recorded on an analog recordable medium comprising:
   a latency detector adapted to send a polarity of pulses to an analog recorder and receive a sample of those pulse from the analog recorder;
   a software module in operable communication with the latency detector, the software module adapted to compensate for a time delay between the recording of sounds on the analog recorder and the reading of sounds from the analog recorder;
   wherein the time and phase of recorded sounds and the read sounds are synchronized.

2. The device of claim 1 wherein the software module further comprises a plug-in module residing on a digital audio workstation and a firmware module residing on a hardware device.

3. The device of claim 1 further comprising an analog-to-digital converter.

4. The device of claim 1 further comprising a digital-to-analog converter.

5. The device of claim 1 further comprising a mixing console.

6. The device of claim 1 further comprising an analog recordable medium.

7. A system for recording audio comprising:
   an analog recordable medium;
   a record head positioned to operably record sounds on the analog recordable medium;
   a playback head adapted to read playback sounds recorded on the analog recordable medium;
   an eraser adapted to erase the sounds recorded on the analog recordable medium;
   a digital audio workstation operably connected to the playback head;
   software to compensate for a time delay between analogically recorded sounds and playback sounds;
   wherein the recordable medium is configured as a cup, a cylinder, a disk, or is H-shaped;
   a servo motor adapted to spin the analog recordable medium or spin the record head, the playback head, and the eraser in an axial direction;
   wherein the analog recordable medium or the record head, the playback head, and the eraser are adapted to traverse perpendicularly to the axial direction; and
   a laser in operable communication with the playback head.

8. A system for recording audio comprising:
   an analog recordable medium;
   a record head positioned to operably record sounds on the analog recordable medium;
   a playback head adapted to read playback sounds recorded on the analog recordable medium;
   an eraser adapted to erase the sounds recorded on the analog recordable medium;
   a digital audio workstation operably connected to the playback head;
   software to compensate for a time delay between analogically recorded sounds and playback sounds;
   wherein the recordable medium is configured as a cup, a cylinder, a disk, or is H-shaped;
   a servo motor adapted to spin the analog recordable medium or spin the record head, the playback head, and the eraser in an axial direction;
   wherein the analog recordable medium or the record head, the playback head, and the eraser are adapted to traverse perpendicularly to the axial direction; and
   wherein the record head and the playback heads are configured as flying heads with respect to the recordable medium.

9. A system for recording audio comprising:
   an analog recordable medium;
   a record head positioned to operably record sounds on the analog recordable medium;
   a playback head adapted to read playback sounds recorded on the analog recordable medium;
   an eraser adapted to erase the sounds recorded on the analog recordable medium;
   a digital audio workstation operably connected to the playback head;
   software to compensate for a time delay between analogically recorded sounds and playback sounds;
   wherein the recordable medium is configured as a cup, a cylinder, a disk, or is H-shaped;
   a servo motor adapted to spin the analog recordable medium or spin the record head, the playback head, and the eraser in an axial direction;
   wherein the analog recordable medium or the record head, the playback head, and the eraser are adapted to traverse perpendicularly to the axial direction; and
   an emulator for emulating the characteristics of a particular analog recorder.

10. A method for digitally broadcasting analog audio comprising:
    calculating a time delay between a record head of a recorder and a playback head of a recorder;
    analogically recording sounds on an analog recordable medium with the record head; reading the analogically recorded sounds off the analog recordable medium with the playback head while analogically recording new sounds on the analog recordable medium with the record head;
    transferring the read sounds from the playback head to a digital audio workstation while continuing to analogically record sounds on the analog recordable medium with the record head; compensating for the time delay between the analogically recorded sounds and the read sounds with a software driver running on the digital audio workstation;
    synchronizing the time and phase of the analogically recorded sounds and the read sounds;
    broadcasting the read sounds; and
    simultaneously monitoring pre-recorded sounds and synchronized post-recorded sounds while synchronistically over dubbing the pre-recorded sounds.

* * * * *

UNITED STATES PATENT AND TRADEMARK OFFICE
CERTIFICATE OF CORRECTION

| | |
|---|---|
| PATENT NO. | : 8,630,727 B2 |
| APPLICATION NO. | : 12/757857 |
| DATED | : January 14, 2014 |
| INVENTOR(S) | : Christopher A. Estes |

It is certified that error appears in the above-identified patent and that said Letters Patent is hereby corrected as shown below:

On Title Page 2, Item (56) Column 1 should be -- 5,847,769…Cooper --

In the Specification

Column 1, line 31, "the increasingly presence of digital" should be -- the increasing presence of digital --

Column 2, line 14, "to provide a system and/or components therefore" should be -- to provide a system and/or components therefor --

Column 2, line 19, "It another object of the invention to" should be -- It is another object of the invention to --

Column 4, line 21, "diagrammatic view an embodiment" should be -- diagrammatic view of an embodiment --

Column 4, line 23, "diagrammatic view an embodiment" should be -- diagrammatic view of an embodiment --

Column 4, line 25, "diagrammatic view an embodiment" should be -- diagrammatic view of an embodiment --

Column 4, line 27, "diagrammatic view an embodiment" should be -- diagrammatic view of an embodiment --

Column 4, line 29, "diagrammatic view an embodiment" should be -- diagrammatic view of an embodiment --

Signed and Sealed this
Sixth Day of January, 2015

Michelle K. Lee
*Deputy Director of the United States Patent and Trademark Office*

CERTIFICATE OF CORRECTION (continued)
U.S. Pat. No. 8,630,727 B2

Column 4, line 33, "FIG. 24B a diagrammatic top view" should be -- FIG. 24B is a diagrammatic top view --

Column 4, line 48, "FIG. 29 is diagrammatic perspective view" should be -- FIG. 29 is a diagrammatic perspective view --

Column 4, line 50, "FIG. 30 is diagrammatic perspective view" should be -- FIG. 30 is a diagrammatic perspective view --

Column 4, line 57, "As illustrated, on embodiment of the system 10 utilizes" should be -- As illustrated, one embodiment of the system 10 utilizes --

Column 6, line 26, "In a configurations where" should be -- In configurations where --

Column 6, lines 64-65, "via standard a MIDI machine control" should be -- via a standard MIDI machine control --

Column 7, lines 27-28, "may be still be utilized in" should be -- may still be utilized in --

Column 9, line 37, "used to rewind or rest the analog recorder" should be -- used to rewind or reset the analog recorder --

Column 10, line 17, "endless of loop tape 20 that could" should be -- endless loop of tape 20 that could --

Column 10, line 30, "it be placed on the cup and then" should be -- it may be placed on the cup and then --

Column 10, lines 53-54, "which is operable contact with a" should be -- which is in operable contact with a --

Column 10, line 64, "which is connect to the heads" should be -- which is connected to the heads --

Column 11, lines 8-9, "the servo motor 166 operationally attached to the base plate 172 which in turn is" should be -- the servo motor 166 is operationally attached to the base plate 172 which in turn is --

Column 11, line 55, "medium may be have a" should be -- medium may have a --

Column 11, lines 65-57, "portion of its surface that…to be devoted to a head cleaning strip 186." should be -- portion of its surface… be devoted to a head cleaning strip 186. --

Column 11, last line, "are typically position on a rail 198" should be -- are typically positioned on a rail 198 --

CERTIFICATE OF CORRECTION (continued)
U.S. Pat. No. 8,630,727 B2

Column 12, lines 9-10, "for vertical movement as the drum 204, 206 spin." should be -- for vertical movement as the drums 204, 206 spin. --

Column 12, lines 57-58, "is yet recordable medium that may be" should be -- is yet another recordable medium that may be --

Column 13, line 16, "signal 70 is feed to the" should be -- signal 70 is fed to the --

Column 14, line 12, "which in turn is in turn in" should be -- which in turn is in --

In the Claims

Claim 1
Column 15, line 8, "analog recorder and receive a sample of those pulse from" should be -- analog recorder and receive a sample of those pulses from --